(12) United States Patent
Bansal et al.

(10) Patent No.: US 9,483,600 B2
(45) Date of Patent: Nov. 1, 2016

(54) MULTI SUPPLY CELL ARRAYS FOR LOW POWER DESIGNS

(71) Applicant: QUALCOMM Incorporated, San Diego, CA (US)

(72) Inventors: Mamta Bansal, San Diego, CA (US); Uday Doddannagari, San Diego, CA (US); Paras Gupta, San Diego, CA (US); Ramaprasath Vilangudipitchai, San Diego, CA (US); Parissa Najdesamii, San Diego, CA (US); Dorav Kumar, San Diego, CA (US); Nitin Partani, Bangalore KRN (IN)

(73) Assignee: QUALCOMM INCORPORATED, San Diego, CA (US)

( * ) Notice: Subject to any disclaimer, the term of this patent is extended or adjusted under 35 U.S.C. 154(b) by 12 days.

(21) Appl. No.: 14/645,336

(22) Filed: Mar. 11, 2015

(65) Prior Publication Data

US 2015/0262936 A1   Sep. 17, 2015

Related U.S. Application Data

(60) Provisional application No. 61/953,712, filed on Mar. 14, 2014.

(51) Int. Cl.
*H01L 25/00* (2006.01)
*G06F 17/50* (2006.01)
*H01L 27/02* (2006.01)
*H04W 72/04* (2009.01)
(Continued)

(52) U.S. Cl.
CPC ....... *G06F 17/5077* (2013.01); *G06F 17/5072* (2013.01); *H01L 27/0207* (2013.01); *H04W 72/0453* (2013.01); *H01L 23/5286* (2013.01); *H01L 27/092* (2013.01); *H01L 2924/0002* (2013.01)

(58) Field of Classification Search
CPC ........... H01L 27/0207; H01L 23/5286; H01L 27/11807; H01L 27/118; H01L 23/528
USPC .......................... 327/565–566; 257/206–207
See application file for complete search history.

(56) References Cited

U.S. PATENT DOCUMENTS 5,039,893 A * 8/1991 Tomisawa ..................... 327/276
6,903,389 B1   6/2005 Tai et al.
(Continued)

OTHER PUBLICATIONS

International Search Report and Written Opinion—PCT/US2015/020225—ISA/EPO—Jun. 17, 2015.

*Primary Examiner* — Quan Tra
(74) *Attorney, Agent, or Firm* — Arent Fox LLP

(57) ABSTRACT

A MOS device includes a number of standard cells configured to reduce routing congestions while providing area savings on the MOS device. The standard cells may be single height standard cells that share an n-type well isolated from other nearby n-type wells. The input and output signal pins of the single height standard cells may be configured in a lowest possible metal layer (e.g., M1), while the secondary power pins of the single height standard cells may be configured in a higher metal layer (e.g., M2). Interconnects supplying power to secondary power pins may be configured along vertical tracks and shared among different sets of standard cells, which may reduce the number of vertical tracks used in the MOS device. The number of available horizontal routing tracks in the MOS device may remain unaffected, since the horizontal tracks already used by the primary power/ground mesh are used for power connection.

27 Claims, 18 Drawing Sheets

(51) Int. Cl.
*H01L 23/528* (2006.01)
*H01L 27/092* (2006.01)

(56) References Cited

U.S. PATENT DOCUMENTS

| | | | |
|---|---|---|---|
| 7,129,562 B1 | 10/2006 | Gheewala et al. | |
| 7,219,324 B1 | 5/2007 | Sherlekar et al. | |
| 7,843,227 B2 * | 11/2010 | Isoda | 326/103 |
| 7,948,292 B1 | 5/2011 | Chiu et al. | |
| 8,174,052 B2 | 5/2012 | Kim et al. | |
| 8,410,526 B2 | 4/2013 | Shimizu | |
| 8,698,205 B2 | 4/2014 | Tzeng et al. | |
| 8,698,537 B1 * | 4/2014 | Song et al. | 327/284 |
| 8,736,304 B2 * | 5/2014 | Boerstler et al. | 326/81 |
| 8,742,464 B2 | 6/2014 | Sherlekar et al. | |
| 2003/0230769 A1 | 12/2003 | Tsutsumi et al. | |
| 2008/0093632 A1 | 4/2008 | Sakurabayashi | |
| 2008/0246091 A1 * | 10/2008 | Kondo et al. | 257/369 |
| 2013/0015882 A1 * | 1/2013 | Datta et al. | 326/80 |

* cited by examiner

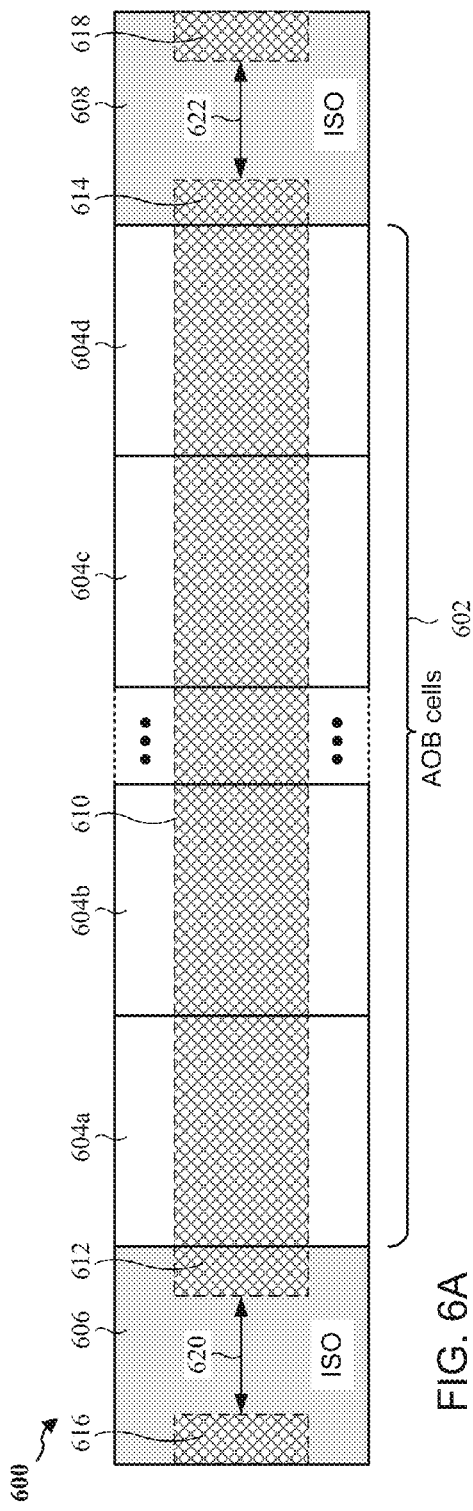
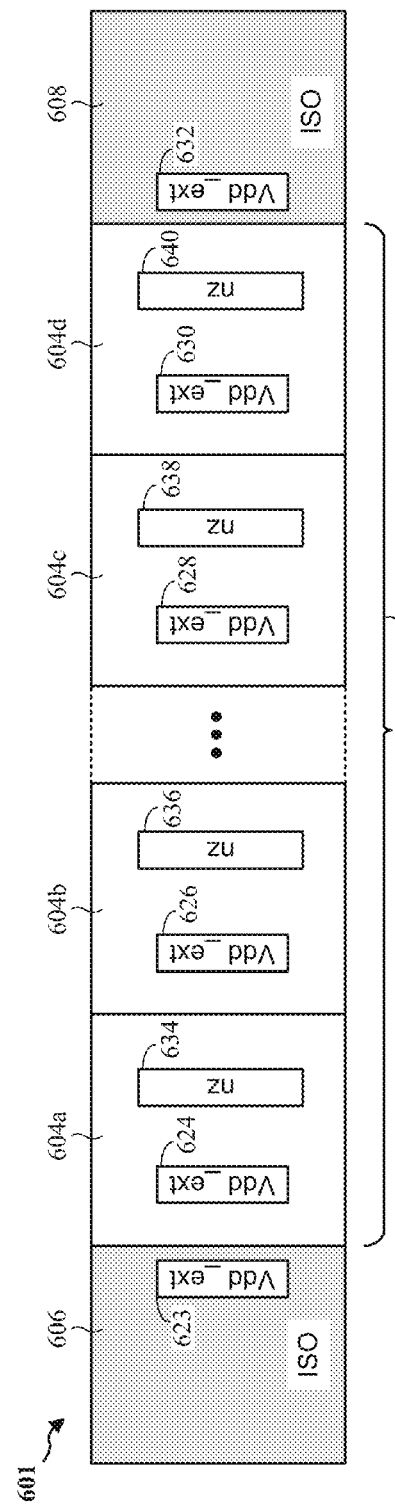
FIG. 6A
FIG. 6B

MULTI SUPPLY CELL ARRAYS FOR LOW POWER DESIGNS

CROSS-REFERENCE TO RELATED APPLICATIONS

This application claims the benefit of U.S. Provisional Application Ser. No. 61/953,712 entitled "AOB ARRAY FLOW FOR FEEDTHROUGH OPTIMIZATION" and filed on Mar. 14, 2014, which is expressly incorporated by reference herein in its entirety.

BACKGROUND

1. Field

The present disclosure relates generally to multi supply cell arrays for low power designs.

2. Background

A standard cell is an integrated circuit that may be implemented with digital logic. A semiconductor die typically contains many standard cells. For example, the standard cells may include buffer cells that operate using a first voltage source that is different from a second voltage source used by other nearby standard cells. Improvements to architectures utilizing such standard cells that operate using the first voltage source are needed to reduce layout area consumption and/or routing congestion on the semiconductor die.

SUMMARY

In an aspect of the disclosure, a metal oxide semiconductor (MOS) device includes a set of standard cells extending in a first direction and including at least two standard cells, the set of standard cells including at least a portion of a first n-type well (n-well) coupled to a first voltage source. The MOS device further includes a first isolation region adjacent a first side of the set of standard cells in the first direction, the first isolation region including a first n-well tap. The MOS device further includes a second isolation region adjacent a second side of the set of standard cells in the first direction, the second isolation region including a second n-well tap. The first n-well is isolated from a second n-well adjacent to the first n-well by at least one of the first and second isolation regions, the second n-well being coupled to a second voltage source. The aspects of the disclosure may reduce routing congestion in the MOS device. For example, the standard cells in the set may be single height standard cells. The input and output signal pins of the single height standard cells may be configured in a lowest possible metal layer, such as the metal 1 (M1) layer, and the secondary power pins of the single height standard cells may be configured in the metal 2 (M2) layer. Interconnects supplying power to these secondary power pins in the M2 layer may be configured along vertical tracks and shared among different sets of standard cells. Such a configuration may reduce the number of vertical tracks used in the MOS device, thereby reducing routing congestion in the MOS device. The number of free horizontal routing tracks in the MOS device may remain unaffected, since the horizontal tracks already used by the primary power/ground mesh are used for power connection.

BRIEF DESCRIPTION OF THE DRAWINGS

FIG. 6A is a diagram illustrating a set of buffer cells in accordance with various aspects of the disclosure.

FIG. 6B is a diagram illustrating a set of buffer cells in accordance with various aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Apparatuses and methods will be described in the following detailed description and may be illustrated in the accompanying drawings by various blocks, modules, components, circuits, steps, processes, algorithms, elements, etc.

Figure 1:
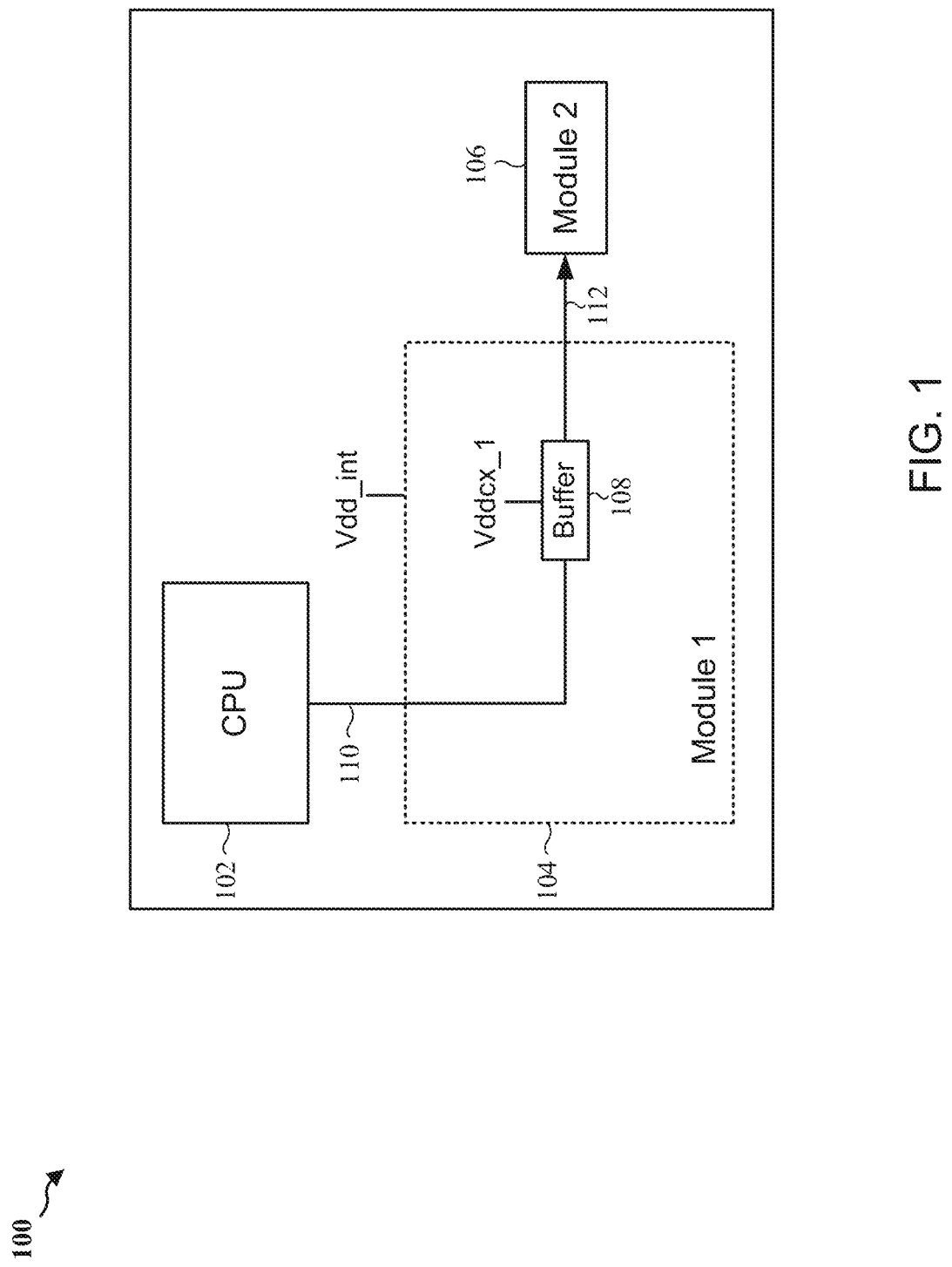
FIG. 1 is a diagram illustrating an example semiconductor die in accordance with various aspects of the disclosure.

FIG. 1 is a diagram illustrating an example semiconductor die 100 in accordance with various aspects of the disclosure. As shown in FIG. 1, semiconductor die 100 includes a central processing unit (CPU) 102, a first module 104, a second module 106, and a buffer 108. In FIG. 1, a first transmission line 110 is routed from the CPU 102 to an input of the buffer 108, and a second transmission line 112 is routed from the output of the buffer 108 to the second module 106. The buffer 108 may serve to increase the strength of a signal transmitted by the CPU 102 to the second module 106 in order to ensure that the signal is successfully received by the second module 106.

As shown in FIG. 1, a portion of the first transmission line 110, the buffer 108, and a portion of the second transmission line 112 are situated in a region (indicated with dotted lines in FIG. 1) of the semiconductor die 100 in which the layout of the first module 104 is configured. As further shown in FIG. 1, the first module 104 is powered by a first voltage source (e.g., "Vdd_int"), and the buffer 108 is powered by a second voltage source (e.g., "Vddcx_1") that is independent of the first voltage source. Therefore, during periods when the first voltage source is powered down (e.g., when the first module 104 is not in use) to conserve an energy supply of the semiconductor die 100, the second voltage source may remain on to continue supplying power to the buffer 108. As such, signals from the CPU to the second module 106 may be strengthened by the buffer 108 during periods when the first voltage source is powered down.

Figure 2:
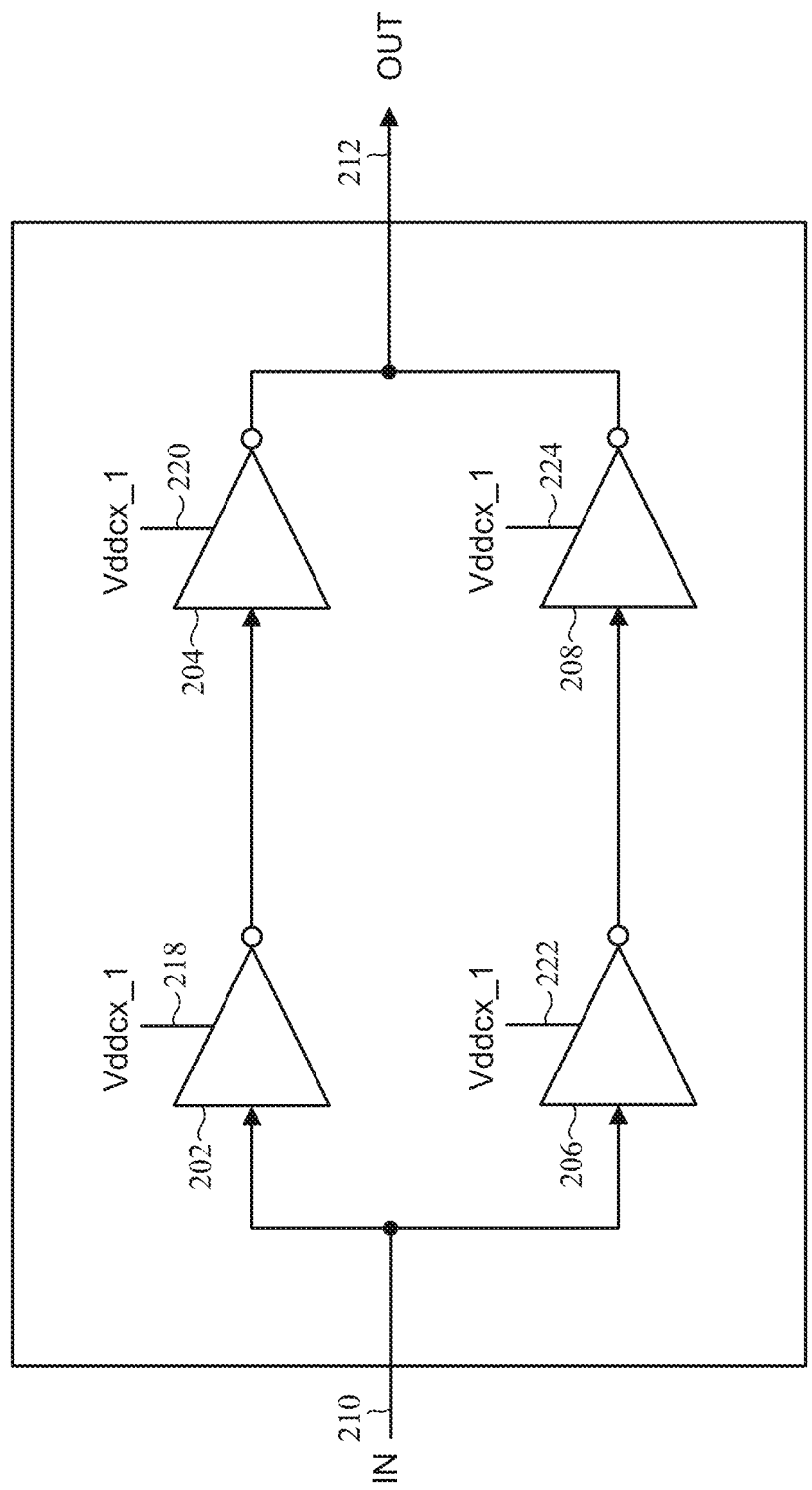
FIG. 2 is a diagram illustrating an exemplary buffer cell in accordance with various aspects of the disclosure.

FIG. 2 is a diagram illustrating an exemplary buffer cell 200 in accordance with various aspects of the disclosure. As shown in FIG. 2, buffer cell 200 includes inverters 202, 204, 206, and 208 arranged in a double height configuration. The output of inverter 202 is coupled to the input of the inverter 204, and the output of inverter 206 is coupled to the input of the inverter 208. The inputs of inverters 202 and 206 are coupled together at input pin (IN) 210 and the outputs of inverters 204 and 208 are coupled together at output pin (OUT) 212, such that an input provided to input pin (IN) 210 is regenerated at the output pin (OUT) 212. As shown in FIG. 2, the power pins 218, 220, 222, and 224 (also referred to as Vdd_ext power pins) of the corresponding inverters 202, 204, 206, and 208 are coupled to a voltage source (e.g., Vddcx_1) that may be configured to always remain powered on. For example, the buffer cell 200 may remain powered on despite being situated in a region on a semiconductor die receiving power from a different voltage source (e.g., Vdd_int) that may be powered off under various circumstances to conserve power.

Figure 3:
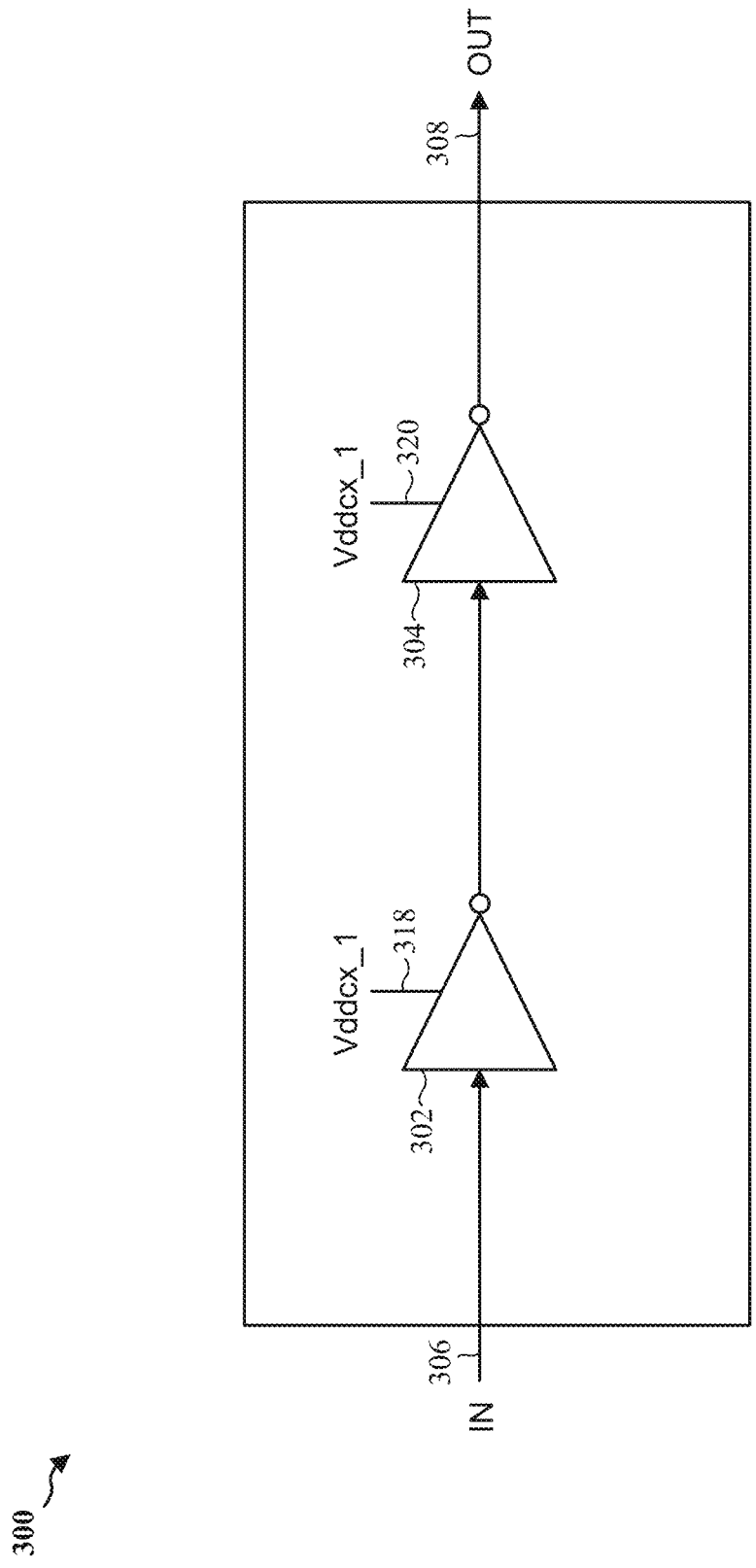
FIG. 3 is a diagram illustrating an exemplary buffer cell in accordance with various aspects of the disclosure.

FIG. 3 is a diagram illustrating an exemplary buffer cell 300 in accordance with various aspects of the disclosure. As shown in FIG. 3, buffer cell 300 includes inverters 302 and 304 arranged in a single height configuration. As further shown in FIG. 3, the output of inverter 302 is coupled to the input of the inverter 304 such that an input provided to input pin (IN) 306 of the inverter 302 is regenerated at the output pin (OUT) 308 of the inverter 304. As shown in FIG. 3, the power pins 318 and 320 (also referred to as Vdd_ext power pins) of the corresponding inverters 302 and 304 are coupled to a voltage source (e.g., Vddcx_1) that may be configured to always remain powered on. For example, the buffer cell 300 may remain powered on despite being situated in a region on a semiconductor die receiving power from a different voltage source (e.g., Vdd_int) that may be powered off under various circumstances to conserve power.

Figure 4:
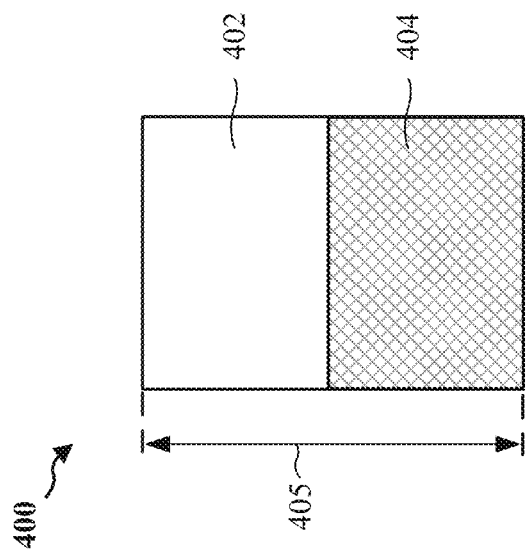
FIG. 4 is a diagram illustrating a single height standard cell in accordance with various aspects of the disclosure.

FIG. 4 is a diagram illustrating a top view of a single height standard cell 400. As shown in FIG. 4, single height standard cell 400 includes a p-type region 402 and an n-type region (also referred to as an n-well) 404. As shown in FIG. 4A, the single height standard cell 400 has a height 405. In an aspect, the buffer cell 300 discussed supra with respect to FIG. 3 may be implemented using the single height standard cell 400.

Figure 5:
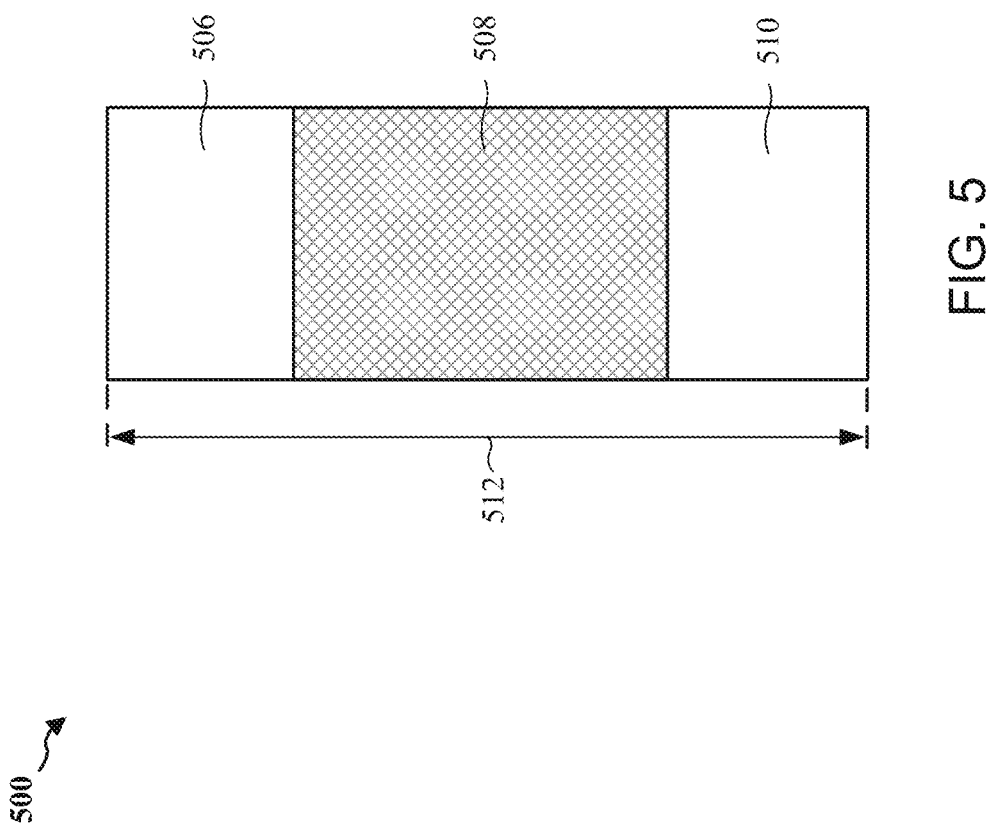
FIG. 5 is a diagram illustrating a double height standard cell in accordance with various aspects of the disclosure.

FIG. 5 is a diagram illustrating a top view of a double height cell 500. As shown in FIG. 5, double height standard cell 500 includes p-type regions 506, 510 and n-type region 508. As shown in FIG. 5, the double height standard cell 500 has a height 512. In an aspect, the height 512 of the double height standard cell 500 is approximately twice the height 405 of the single height standard cell 400. In an aspect, the double height standard cell 500 may be achieved by configuring two single height standard cells (e.g., two of the single height standard cells 400 in FIG. 4) such that the n-type regions of the single height standard cells are joined together. In an aspect, the buffer cell 200 discussed supra with respect to FIG. 2 may be implemented using the double height standard cell 500.

FIG. 6A is a diagram illustrating a MOS device 600 that includes a set of buffer cells in accordance with various aspects of the disclosure. As shown in FIG. 6A, a set of buffer cells 602 (also referred to always on buffer (AOB) cells) may include buffer cells 604a, 604b, 604c, and 604d. It should be understood that in other aspects, the set of buffer cells 602 may include a greater number of buffer cells or a lesser number of buffer cells than shown in FIG. 6A. In an aspect, each of the buffer cells 604a, 604b, 604c, and 604d may include four inverters arranged in a double height configuration, such as the double height configuration described supra with respect to FIG. 2.

As shown in FIG. 6A, each of the buffer cells 604a, 604b, 604c, and 604d includes at least a portion of an n-well (indicated by the crosshatched region in FIG. 6A) that extends from one edge of the buffer cell to the other edge of the buffer cell. The contiguous n-wells of the buffer cells 604a, 604b, 604c, and 604d form the n-well 610. For example, the n-well 610 may be situated on a p-type substrate of a semiconductor die, such as semiconductor die 100 in FIG. 1. As shown in FIG. 6A, a first isolation region 606 and a second isolation region 608 are included at each end of the set of buffer cells 602 in order to prevent shorting of the n-well 610 to other nearby n-wells. In the aspect of FIG. 6A, the first and second isolation regions 606, 608 include at least a portion of the n-well 610. For example, a portion 612 of the n-well 610 is included in the first isolation region 606 and a portion 614 of the n-well 610 is included in the second isolation region 608. The first isolation region 606 may include a portion 616 of a first adjacent n-well that is spaced a distance 620 apart from the portion 612 of the n-well 610. The second isolation region 608 may include a portion 618 of a second adjacent n-well that is spaced a distance 622 apart from the portion 614 of the n-well 610. For example, the n-well 610 may be coupled to a voltage source that is different from a voltage source coupled to the portion 616 of the first adjacent n-well or the portion 618 of the second adjacent n-well.

FIG. 6B is a diagram 601 illustrating the set of buffer cells 602 in accordance with various aspects of the disclosure. It should be noted that the n-well 610 shown in FIG. 6A is omitted in FIG. 6B for ease of illustration. As shown in FIG. 6B, the buffer cells 604a, 604b, 604c, and 604d include respective output pins (labeled "nz") 634, 636, 638, and 640. As further shown in FIG. 6B, the buffer cells 604a, 604b, 604c, and 604d include respective power pins (labeled "Vdd_ext") 624, 626, 628, and 630. In an aspect, the power pins 624, 626, 628, and 630 and the output pins 634, 636, 638, and 640 may be configured in a metal 3 (M3) layer. The buffer cells 604a, 604b, 604c, and 604d may each include an input pin (not shown) configured in a metal 1 (M1) layer.

In an aspect, with reference to FIG. 6A, the portion 612 of the n-well 610 included in the first isolation region 606 may be coupled to the second voltage source (e.g., Vddcx_1) via tap 623 (e.g., Vdd_ext pin) shown in FIG. 6B and the portion 614 of the n-well 610 included in the second isolation region 608 may be coupled to the second voltage source (e.g., Vddcx_1) via tap 632 (e.g., Vdd_ext pin). It should be understood that the portions of the first and second n-wells 616, 618 may be coupled to the first voltage source (e.g., Vdd_int) that is independent of the second voltage source. For example, the second voltage source may be an always on voltage source as previously described with respect to FIG. 1.

Figure 7:
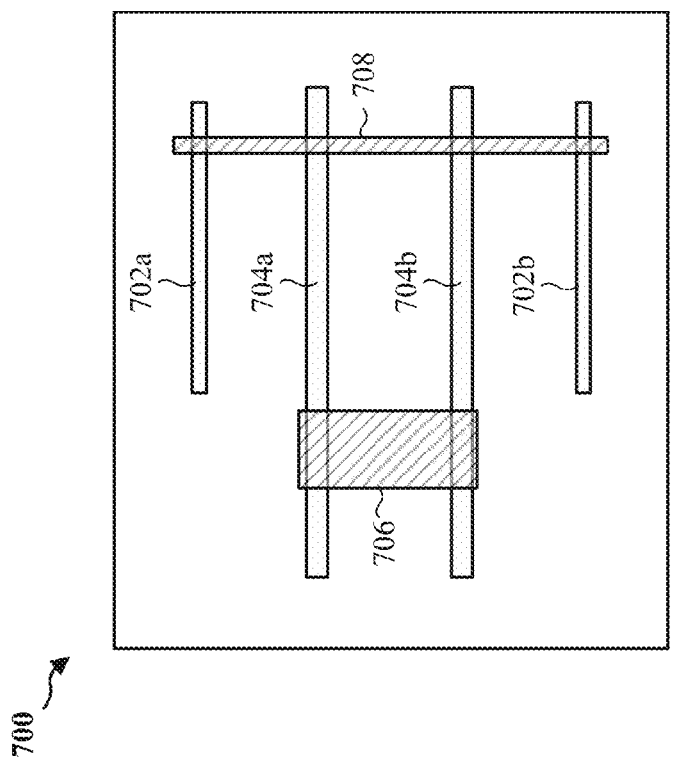
FIG. 7 is a diagram illustrating an exemplary layout configuration of a buffer cell in accordance with various aspects of the disclosure.

FIG. 7 is a diagram illustrating an exemplary layout configuration of a buffer cell 700 in accordance with various aspects of the disclosure. In an aspect, buffer cell 700 may include four inverters arranged in a double height configuration, such as the double height configuration described supra with respect to FIG. 2. As shown in FIG. 7, buffer cell 700 includes buffer output pins 702a and 702b, power pins 704a and 704b, first interconnect 706, and second interconnect 708. The buffer output pins 702a and 702b, and the power pins 704a and 704b may be configured in the M2 layer. The first and second interconnects 706, 708 may be configured in a metal 3 (M3) layer.

In FIG. 7, the power pins 704a, 704b are configured to provide a voltage source (e.g., Vddcx_1 in FIG. 2) to the inverters in the buffer cell 700. The first interconnect 706 connects together the power pins 704a, 704b (referred to as Vdd_ext power pins). The second interconnect 708 connects together the buffer output pins 702a, 702b. For example, with reference to FIG. 2, the buffer output pin 702a may be the output of inverter 204 and the buffer output pin 702b may be the output of inverter 208. In such example, the interconnect 708 may be the output pin (OUT) 212. The buffer input pins (not shown for ease of illustration) of the buffer cell 700 may be configured in a metal 1 (M1) layer.

Figure 8:
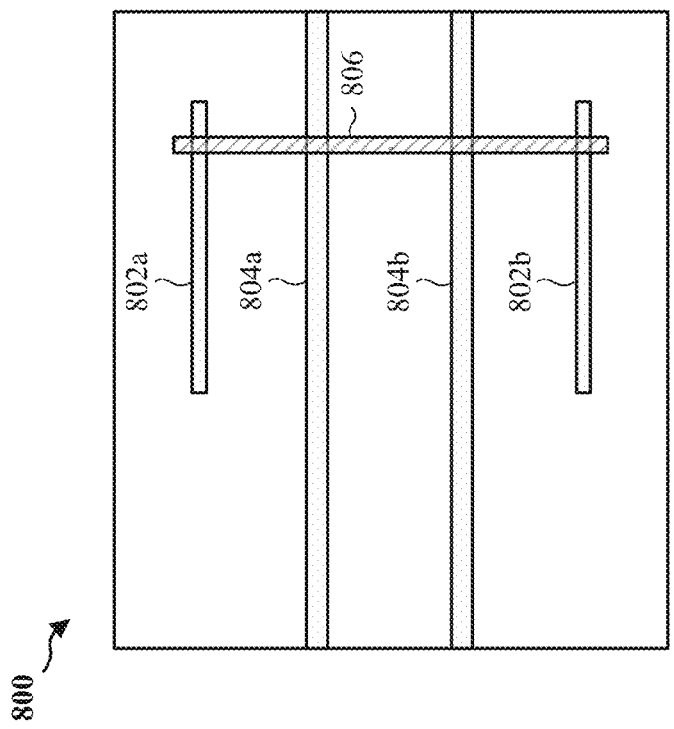
FIG. 8 is a diagram illustrating an exemplary layout configuration of a buffer cell in accordance with various aspects of the disclosure.

FIG. 8 is a diagram illustrating an exemplary layout configuration of a buffer cell 800 in accordance with various aspects of the disclosure. In an aspect, buffer cell 800 may include four inverters arranged in a double height configuration, such as the double height configuration described supra with respect to FIG. 2. As shown in FIG. 8, buffer cell 800 includes buffer output pins 802a and 802b, power pins 804a and 804b (referred to as Vdd_ext power pins), and an interconnect 806. The buffer output pins 802a and 802b, and the power pins 804a and 804b may be configured in the M2 layer. The interconnect 806 may be configured in the M3 layer.

In FIG. 8, the power pins 804a, 804b are configured to provide a voltage source (e.g., Vddcx_1 in FIG. 2) to the inverters in the buffer cell 800. The interconnect 806 connects together the buffer output pins 802a, 802b. For example, with reference to FIG. 2, the buffer output pin 802a may be the output of inverter 204 and the buffer output pin 802b may be the output of inverter 208. In such example, the interconnect 806 may be the output pin (OUT) 212. The buffer input pins (not shown for ease of illustration) of the buffer cell 800 may be configured in the M1 layer. It should be noted that power pins 804a, 804b are extended across the buffer cell 800 to the edges of the buffer cell 800. As discussed infra with respect to FIG. 9, the configuration of FIG. 8 including power pins extended to the edges of the buffer cell enables the formation of power rails. Such power rails avoid the need for an interconnect (e.g., the interconnect 706 implemented in the configuration of FIG. 7) for connecting together the power pins 804a, 804b. It can be appreciated that the absence of such interconnect may reduce routing congestion on a semiconductor die.

Figure 9:
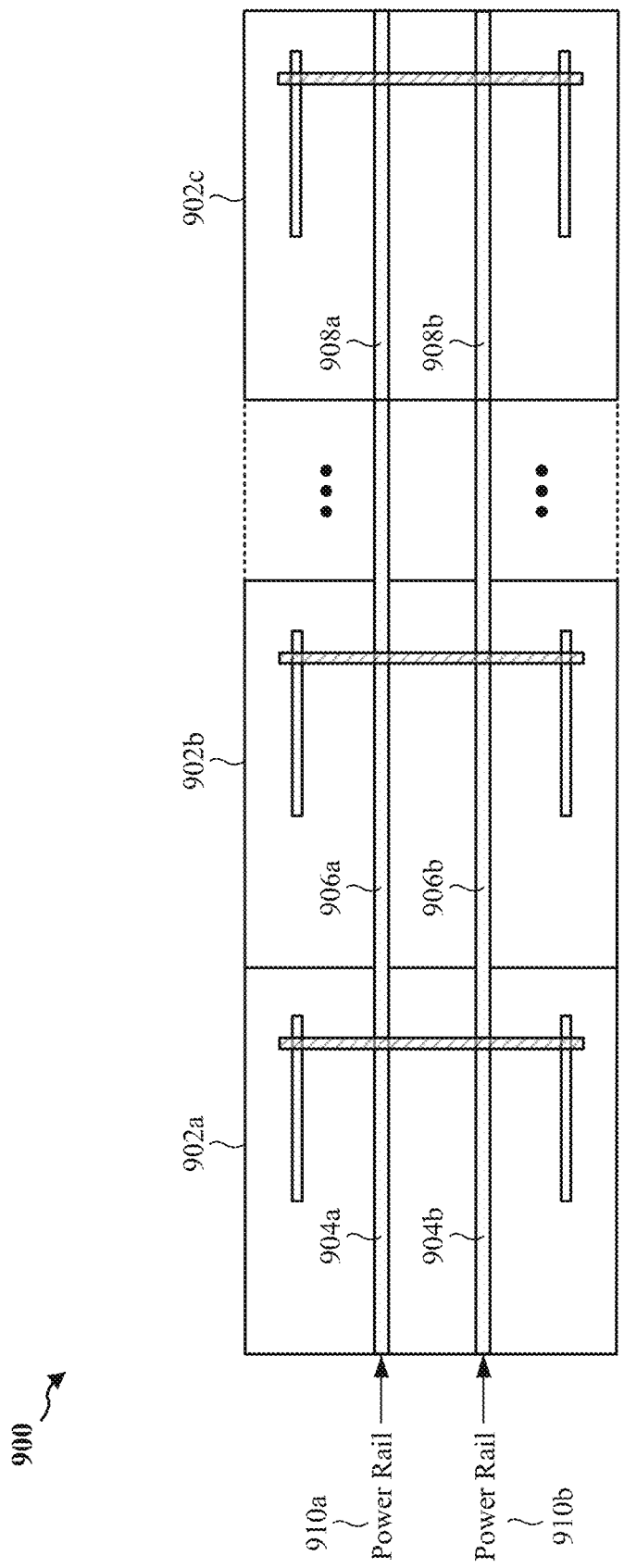
FIG. 9 is a diagram illustrating an exemplary layout configuration of a set of buffer cells in accordance with various aspects of the disclosure.

FIG. 9 is a diagram illustrating an exemplary layout configuration of a set of buffer cells 900 in accordance with various aspects of the disclosure. As shown in FIG. 9, the set of buffer cells 900 includes buffer cells 902a, 902b, and 902c. It should be understood that the set of buffer cells 900 may include a greater number of buffer cells or a lesser number of buffer cells than shown in FIG. 9. In the configuration of FIG. 9, each of the buffer cells 902a, 902b, and 902c in the set of buffer cells 900 corresponds to the buffer cell 800 in FIG. 8. Accordingly, the contiguous power pins 904a, 906a, 908a of corresponding buffer cells 902a, 902b, 902c form a first power rail 910a (also referred to as Vdd_ext pin 910a). The contiguous power pins 904b, 906b, 908b of corresponding buffer cells 902a, 902b, 902c form a second power rail 910b (also referred to as Vdd_ext pin 910b). In an aspect the first and second power rails 910a, 910b may be coupled to a voltage source (e.g., Vddcx_1) and may be configured to provide power to the always on buffer cells 902a, 902b, 902c.

Figure 10:
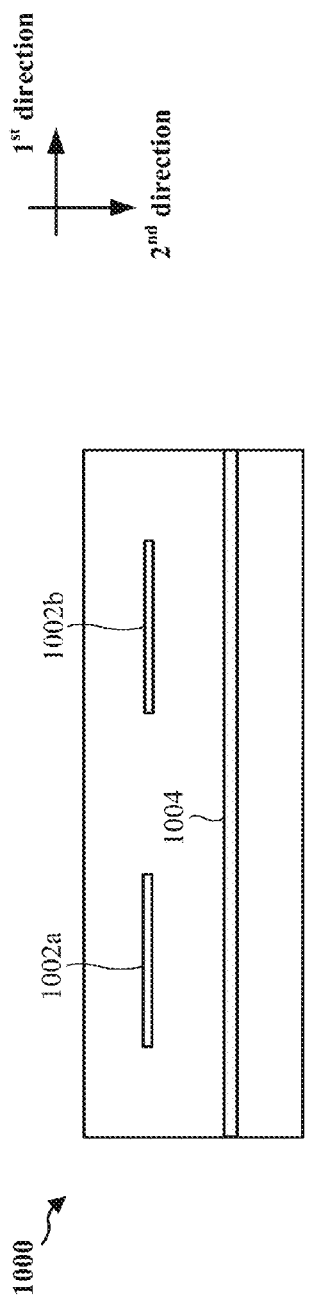
FIG. 10 is a diagram illustrating an exemplary layout configuration of a buffer cell in accordance with various aspects of the disclosure.

FIG. 10 is a diagram illustrating an exemplary layout configuration of a buffer cell 1000 in accordance with various aspects of the disclosure. In an aspect, buffer cell 1000 may include two inverters arranged in a single height configuration, such as the single height configuration described supra with respect to FIG. 3. As shown in FIG. 10, buffer cell 1000 includes buffer input pin 1002a, buffer output pin 1002b, and power pin 1004 (referred to as Vdd_ext power pin). The buffer input pin 1002a, buffer output pin 1002b, and power pin 1004 may be configured in the M2 layer.

In FIG. 10, the power pin 1004 is configured to provide a voltage source (e.g., Vddcx_1) to the inverters in the buffer cell 1000. For example, with reference to FIG. 3, the buffer input pin 1002a may be the input of inverter 302 and the buffer output pin 1002b may be the output of inverter 304. In such example, the buffer input pin 1002a may be the input pin (IN) 306 and the buffer output pin 1002b may be the output pin (OUT) 308. It should be noted that power pin 1004 extends across the buffer cell 1000 to the edges of the buffer cell 1000. It should further be noted that buffer cell 1000 does not require interconnects, such as the first and second interconnects 706, 708 configured in the M3 layer as discussed supra with respect to FIG. 7.

Figure 11:
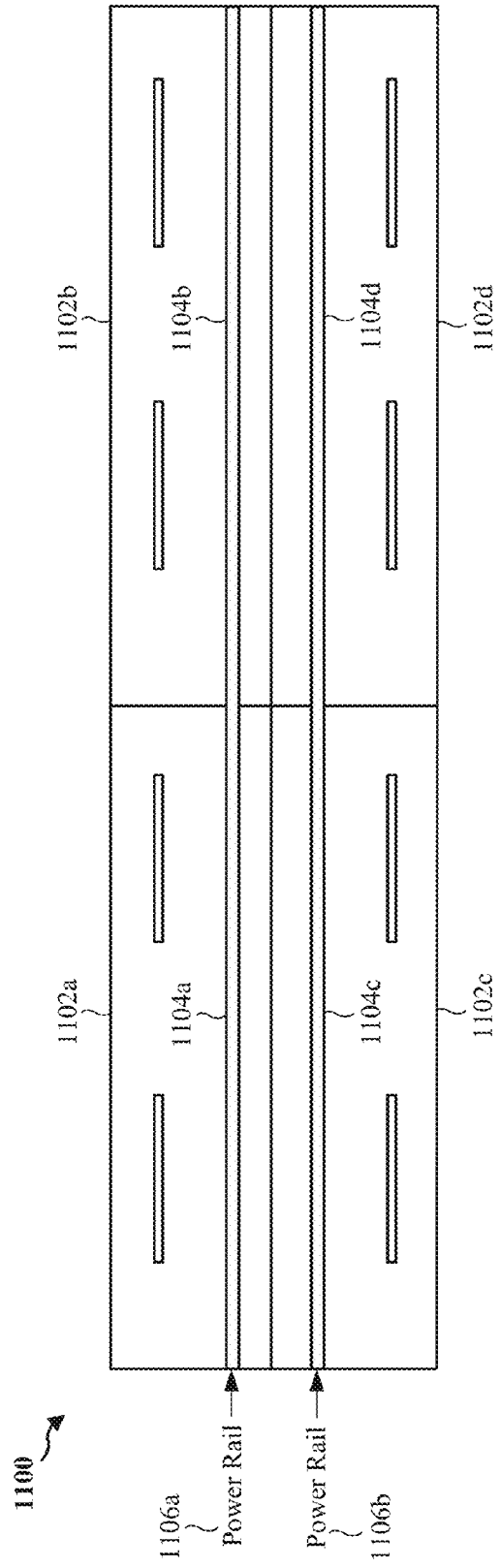
FIG. 11 is a diagram illustrating an exemplary layout configuration of a set of buffer cells in accordance with various aspects of the disclosure.

FIG. 11 is a diagram illustrating an exemplary layout configuration of a set of buffer cells 1100 in accordance with various aspects of the disclosure. As shown in FIG. 11, the set of buffer cells 1100 includes buffer cells 1102a, 1102b, 1102c, and 1102d. It should be understood that the set of buffer cells 1100 may include a greater number of buffer cells or a lesser number of buffer cells than shown in FIG. 11. In the configuration of FIG. 11, each of the buffer cells 1102a, 1102b, 1102c, and 1102d in the set of buffer cells 1100 corresponds to the buffer cell 1000 in FIG. 10. Accordingly, the contiguous power pins 1104a and 1104b of corresponding buffer cells 1102a and 1102b form a first power rail 1106a (also referred to as Vdd_ext power pin 1106a). The contiguous power pins 1104c and 1104d of corresponding buffer cells 1102c and 1102d form a second power rail 1106b (also referred to as Vdd_ext power pin 1106b). In an aspect, the first power rail 1106a may be coupled to a voltage source (e.g., Vddcx_1) to provide power to the always on buffer cells 1102a, 1102b. The second power rail 1106b may be coupled to the voltage source (e.g., Vddcx_1) to provide power to the always on buffer cells 1102c, 1102d.

It should be noted that the single height buffer cell 1000 implemented in the set of buffer cells 1100 in FIG. 11 avoids the need for an interconnect for connecting together the output pins of buffers in a buffer cell, such as the interconnect 806 implemented in the configuration of FIG. 8 for connecting together the buffer output pins 802a and 802b. It can be appreciated that the absence of such interconnect may reduce routing congestion on a semiconductor die.

In an aspect, the area consumed by the single height buffer cell 1000 may be approximately equal to the area consumed by a double height buffer cell, such as buffer cell 700 in FIG. 7, buffer cell 800 in FIG. 8, or buffer cell 902a in FIG. 9. For example, the single height buffer cell 1000 may be configured to have a shape that is more elongated in the horizontal direction than a double height buffer cell, while occupying approximately the same area as the double height buffer cell. Such a configuration enables the single height buffer cell 1000 to provide approximately the same drive strength as a double height buffer cell. For example, due to the elongated shape in the horizontal direction, the single height buffer cell 1000 may achieve the same drive strength as a double height buffer cell by using fewer albeit physically larger inverters than the inverters used in a double height buffer cell.

Figure 12:
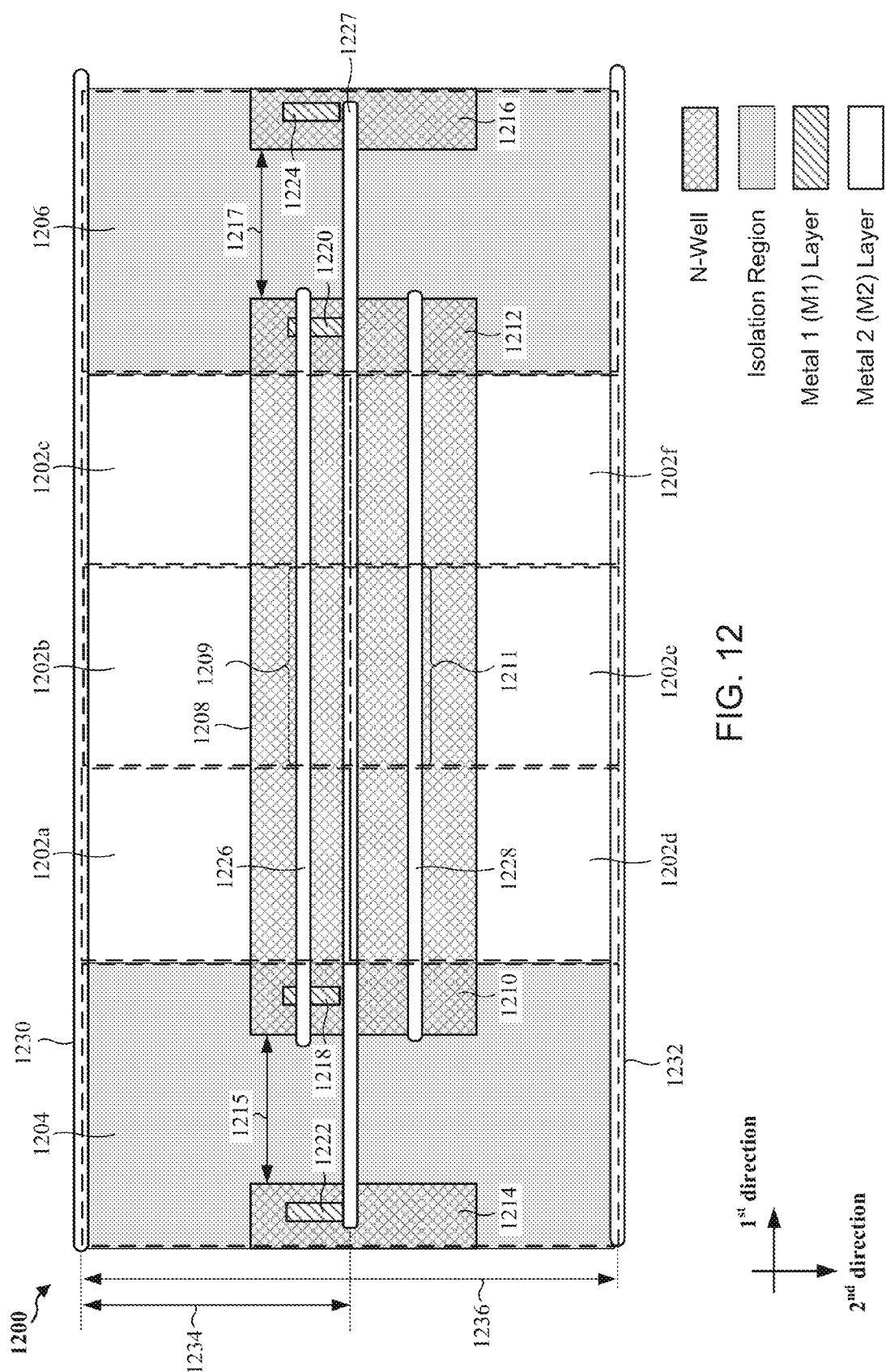
FIG. 12 is a diagram illustrating an exemplary layout of a MOS device in accordance with various aspects of the disclosure.

FIG. 12 is a diagram illustrating an exemplary layout of a MOS device 1200 in accordance with various aspects of the disclosure. As shown in FIG. 12, MOS device 1200 includes a set of buffer cells 1202a, 1202b, 1202c, 1202d, 1202e, 1202f, and first and second isolation cells 1204, 1206. It should be understood that a greater number of buffer cells or a lesser number of buffer cells may be implemented in other aspects. In an aspect, each of the buffer cells 1202a, 1202b, 1202c, 1202d, 1202e, 1202f may correspond to the buffer cell 1000 discussed supra with respect to FIG. 10. In such aspect, each of the buffer cells 1202a, 1202b, 1202c, 1202d, 1202e, 1202f are a single height standard cell including two inverters according to the configuration described supra with respect to FIG. 3. As shown in FIG. 12, the first and second isolation cells 1204, 1206 have a height 1236 and each of the buffer cells 1202a, 1202b, 1202c, 1202d, 1202e, 1202f have a height 1234 that is approximately one half of the height 1236.

The buffer cells 1202a, 1202b, 1202c, 1202d, 1202e, 1202f each include an n-well indicated by the crosshatched region in FIG. 12. The contiguous n-wells of the buffer cells 1202a, 1202b, 1202c, 1202d, 1202e, 1202f form the n-well 1208. For example, the n-well 1208 may be situated on a p-type substrate of a semiconductor die, such as semiconductor die 100 in FIG. 1. As shown in FIG. 12, the first isolation cell 1204 is configured on one end of the set of buffer cells and the second isolation cell 1206 is configured on the other end of the set of buffer cells in order to prevent shorting of the n-well 1208 to other nearby n-wells. The first and second isolation cells 1204, 1206 include at least a portion of the n-well 1208. For example, a portion 1210 of the n-well 1208 may be included in the first isolation cell 1204 and a portion 1212 of the n-well 1208 may be included in the second isolation cell 1206. The first isolation cell 1204 includes a portion 1214 of a first adjacent n-well that is spaced a distance 1215 apart from the portion 1210 of the n-well 1208. The second isolation cell 1206 includes a portion 1216 of a second adjacent n-well that is spaced a distance 1217 apart from the portion 1212 of the n-well 1208.

As shown in FIG. 12, each of the buffer cells 1202a, 1202b, 1202c includes a power pin that extends from one edge of the buffer cell to the other edge of the buffer cell, such as the power pin 1209 of buffer cell 1202b. Accordingly, the contiguous power pins of the buffer cells 1202a, 1202b, 1202c form the power rail 1226. As further shown in FIG. 12, each of the buffer cells 1202d, 1202e, 1202f includes a power pin that extends from one edge of the buffer cell to the other edge of the buffer cell, such as the power pin 1211 of the buffer cell 1202e. Accordingly, the contiguous power pins of the buffer cells 1202d, 1202e, 1202f form the power rail 1228. In the aspect of FIG. 12, the power rails 1226, 1228 are configured in the M2 layer. The buffer cells 1202a, 1202b, 1202c, 1202d, 1202e, 1202f may each include an input pin (not shown) and an output pin (not shown) configured in the M1 layer.

In an aspect, the power rails 1226, 1228 may be coupled to the second voltage source (e.g., Vddcx_1) and the power rail 1227 may be coupled to the first voltage source (e.g., Vdd_int) that is independent of the second voltage source. In such aspect, the portion 1210 of the n-well 1208 included in the first isolation cell 1204 may be coupled to the second voltage source (e.g., Vddcx_1) via tap 1218. The portion 1212 of the n-well 1208 included in the second isolation cell 1206 may also be coupled to the second voltage source via tap 1220. In an aspect, the taps 1218, 1220 may be configured in the M1 layer. The portion 1214 of the first adjacent n-well included in the first isolation cell 1204 is coupled to the second voltage source (e.g., Vdd_int) via tap 1222. The portion 1216 of the second adjacent n-well included in the second isolation cell 1206 is also coupled to the second voltage source via tap 1224. Power rails 1230, 1232 are coupled to ground (e.g., Vssx_0).

Figures 13, 14:
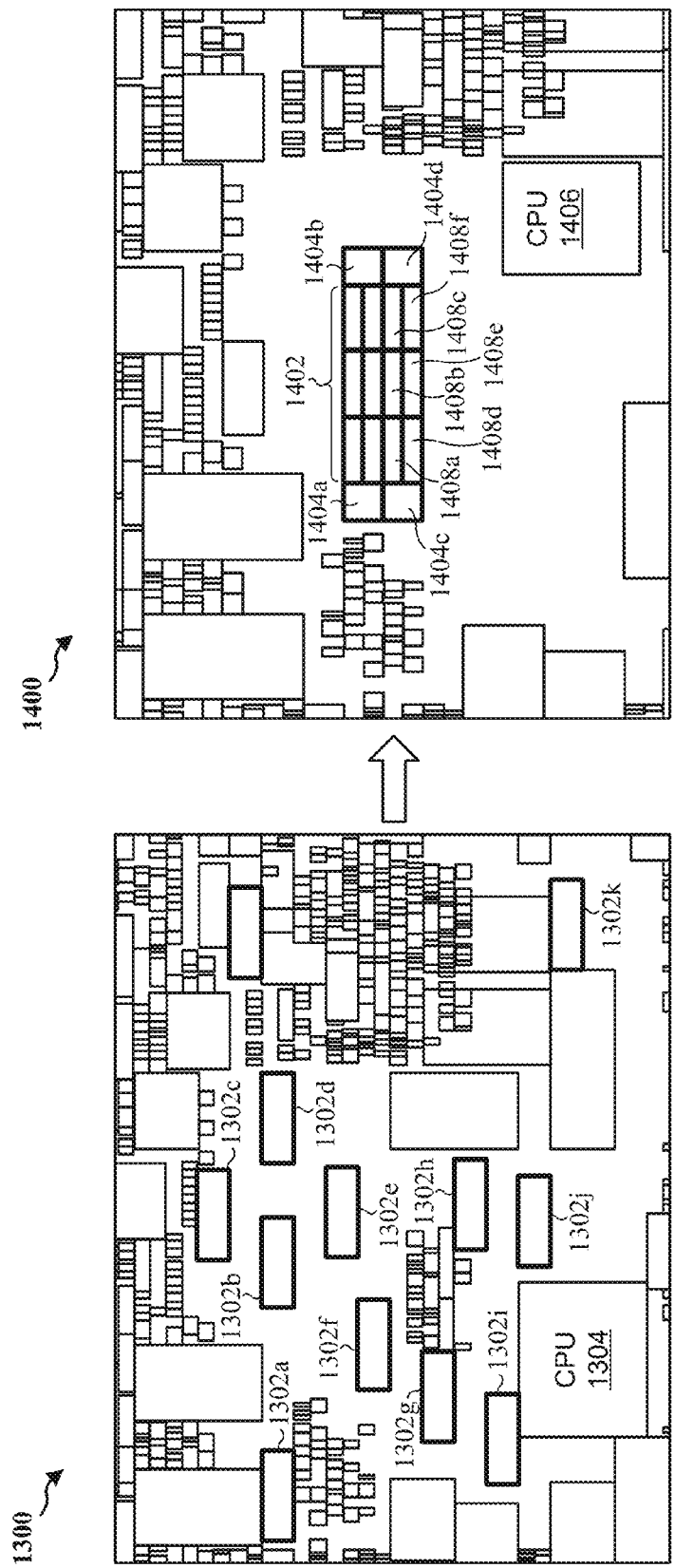
FIG. 13 is a diagram illustrating an exemplary layout configuration of a semiconductor die in accordance with various aspects of the disclosure.
FIG. 14 is a diagram illustrating an exemplary layout configuration of a semiconductor die in accordance with various aspects of the disclosure.

FIG. 13 is a diagram illustrating an exemplary layout configuration of a semiconductor die 1300 in accordance with various aspects of the disclosure. As shown in FIG. 13, semiconductor die 1300 includes various devices, such as the CPU 1304, and buffer cells 1302a, 1302b, 1302c, 1302d, 1302e, 1302f, 1302g, 1302h, 1302i, 1302j, and 1302k. In an aspect, each of the buffer cells 1302a to 1302k may correspond to the buffer cell 200 as discussed supra with respect to FIG. 2, where the buffer cell 200 includes inverters 202, 204, 206, and 208 arranged in a double height configuration. In FIG. 13, each of the buffer cells 1302a to 1302k may include an independent n-well and isolation regions at each end of the n-well.

FIG. 14 is a diagram illustrating an exemplary layout configuration of a semiconductor die 1400 in accordance with various aspects of the disclosure. As shown in FIG. 14, semiconductor die 1400 includes various devices, such as the CPU 1406, and a set of buffer cells 1402. In FIG. 14, the set of buffer cells 1402 includes 12 buffer cells that are grouped together, such as buffer cells 1408a, 1408b, 1408c, 1408d, 1408e, 1408f. The set of buffer cells 1402 may include a greater number of buffer cells or a lesser number of buffer cells in other aspects. As shown in FIG. 14, isolation cells 1404a, 1404c are configured on one side of the set of buffer cells 1402 and isolation cells 1404b, 1404d are configured on the other side of the set of buffer cells 1402. In an aspect, each buffer cell in the set of buffer cells 1402 may be a single height buffer cell. For example, isolation regions 1404a, 1404b, 1404c, and 1404d may have the same height, and each buffer cell in the set of buffer cells 1402 may have approximately one half of the height of the isolation regions. In an aspect, and with reference to FIG. 12, the buffer cells 1408a, 1408b, 1408c, 1408d, 1408e, and 1408f may correspond to the buffer cells 1202a, 1202b, 1202c, 1202d, 1202e, 1202f, and the isolation cells 1404c, 1404d may correspond to the isolation cells 1204, 1206.

It can be appreciated that the grouping of the buffer cells (e.g., the set of buffer cells 1402) as shown in the configuration of FIG. 14 requires substantially fewer isolation cells than the dispersed buffer cells (e.g., 1302a, 1302b, 1302c, 1302d, 1302e, 1302f, 1302g, 1302h, 1302i, 1302j, and 1302k) shown in the configuration of FIG. 13. As a result, the buffer cell layout configurations (e.g., buffer cell 1000 in FIG. 10) disclosed herein may enable grouping of buffer cells to achieve substantial area savings on a semiconductor die.

Figure 15A:
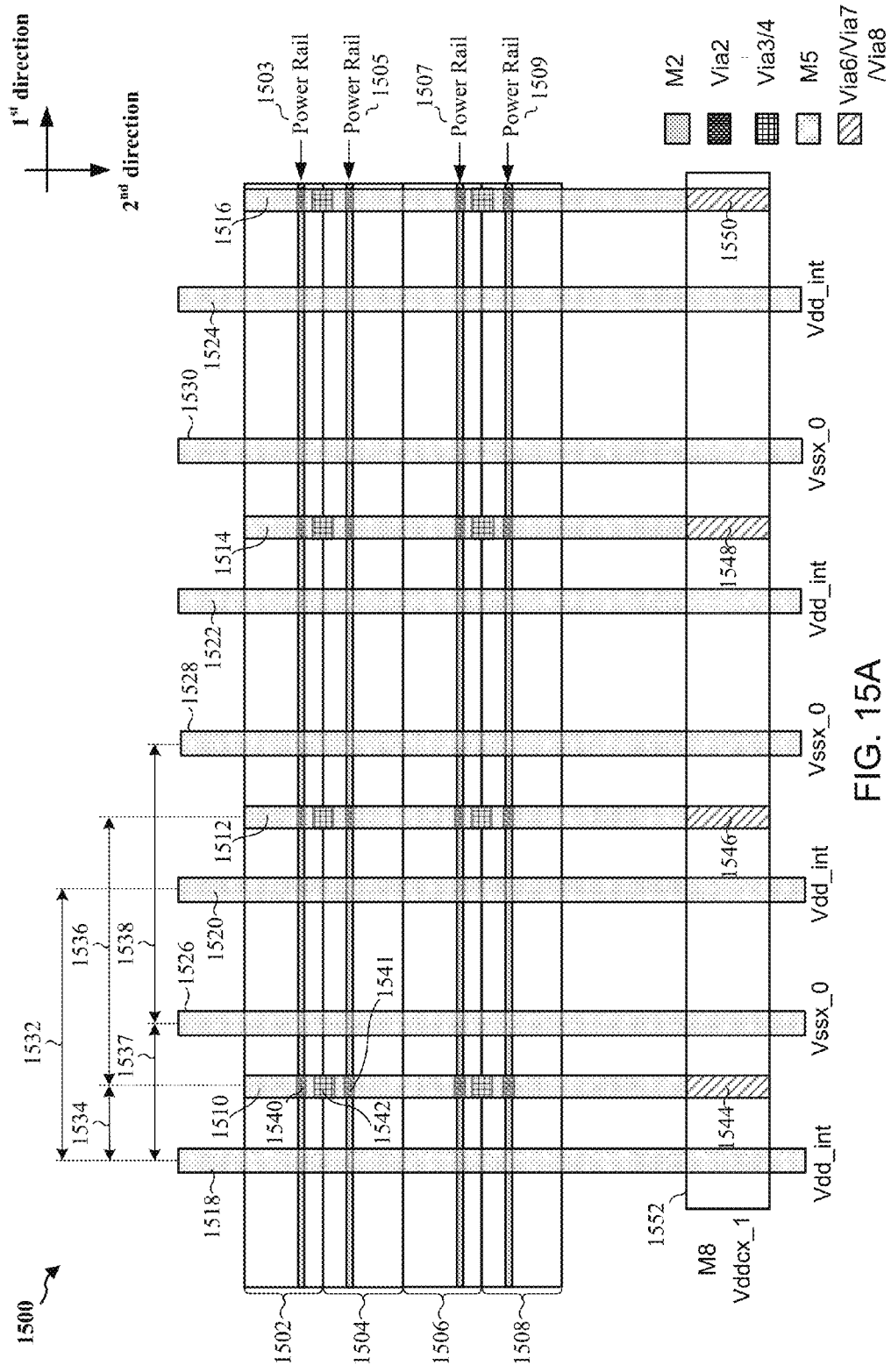
FIG. 15A is a diagram illustrating a top view of an exemplary power strapping configuration in a MOS device in accordance with various aspects of the present disclosure.

FIG. 15A is a diagram illustrating a top view of an exemplary power strapping configuration in a MOS device 1500 in accordance with various aspects of the present disclosure. FIG. 15A includes rows of contiguous buffer cells (e.g., rows 1502, 1504, 1506, 1508) and power interconnects extending across the rows of contiguous buffer cells. In FIG. 15A, for example, each of rows 1502, 1504, 1506, and 1508 includes four contiguous buffer cells. For example, each buffer cell in FIG. 15A may be a single height buffer cell. In an aspect, each buffer cell corresponds to the buffer cell 1000 discussed supra with respect to FIG. 10. It should be understood that a greater or lesser number of rows of buffer cells may be implemented than shown in FIG. 15A. It should also be understood that a greater or lesser number of buffer cells may be implemented in each row than shown in FIG. 15A. As further shown in FIG. 15A, each row of contiguous buffer cells forms a power rail that extends across the row of buffer cells in a first direction. For example, power rail 1503 is formed by the buffer cells in row 1502, power rail 1505 is formed by the buffer cells in row 1504, power rail 1507 is formed by the buffer cells in row 1506, and power rail 1509 is formed by the buffer cells in row 1508. In FIG. 15A, power rails 1503, 1505, 1507, and 1509 are formed in the M2 layer.

FIG. 15A further includes M5 layer power interconnects 1518, 1520, 1522, and 1524 (also referred to as a first set of power interconnects), M5 layer power interconnects 1510, 1512, 1514, and 1516 (also referred to as a second set of power interconnects), and M5 layer power interconnects 1526, 1528, and 1530 (also referred to as a third set of power interconnects). As shown in FIG. 15A, the first, second, and third sets of power interconnects extend in a second direction, where the second direction is orthogonal to the first direction. As shown in FIG. 15A, power interconnects 1518, 1520, 1522, and 1524 have a pitch 1532, power interconnects 1510, 1512, 1514, and 1516 have a pitch 1536, and power interconnects 1526, 1528, and 1530 have a pitch 1538. In an aspect, pitches 1532, 1536, and 1538 are approximately equal. In such aspect, and as shown in FIG. 15A, each of the power interconnects 1510, 1512, 1514, and 1516 are configured approximately midway between two adjacent power interconnects. For example, the power interconnect 1510 is configured between adjacent power interconnects 1518 and 1526, such that the distance 1534 is approximately one half of the distance 1537. As further shown in FIG. 15A, each power interconnect in the first set of power interconnects is adjacent to a power interconnect in the third set of power interconnects without a power interconnect of the second set of power interconnects therebetween. For example, power interconnect 1526 is adjacent to power interconnect 1520 without any of power interconnects 1510, 1512, 1514, and 1516 being situated between the power interconnects 1526 and 1520.

In FIG. 15A, each of the power interconnects 1510, 1512, 1514, and 1516 configured in the M5 layer are connected to the power rails 1503, 1505, 1507, and 1509 configured in the M2 layer. For example, power interconnect 1510 is connected to the power rail 1503 through vias 1540 and 1542, where via 1540 connects the M2 layer to the M3 layer and where vias 1542 connect the M3 layer to the M5 layer through the M4 layer. In such example, power interconnect 1510 is connected to the power rail 1505 through vias 1541 and 1542, where via 1541 connects the M2 layer to the M3 layer and where vias 1542 connect the M3 layer to the M5 layer through the M4 layer. As shown in FIG. 15A, power interconnect 1510 is connected to power rails 1507 and 1509 using vias similar to vias 1540, 1541, and 1542. As shown in FIG. 15A, each of the power interconnects 1510, 1512, 1514, and 1516 in the M5 layer are further connected to the interconnect 1552 configured in the M8 layer through respective vias 1544, 1546, 1548, and 1550. For example, the power interconnect 1510 is connected to the power interconnect 1552 through via 1544, where via 1544 connects the M5 layer to the M8 layer through the M6 and M7 layers. In the configuration of FIG. 15A, the power interconnects 1518, 1520, 1522, and 1524, and the power interconnects 1526, 1528, and 1530 are not connected to the power rails 1503, 1505, 1507, and 1509.

As shown in FIG. 15A, the power interconnects 1518, 1520, 1522, and 1524 are coupled to a first voltage source (e.g., Vdd_int), and power interconnects 1526, 1528, and 1530 are coupled to ground (e.g., Vssx_0). As further shown in FIG. 15A, the power interconnect 1552 is coupled to a second voltage source (e.g., Vddcx_1) and, therefore, the power interconnect 1552 provides the second voltage source to each of the power interconnects 1510, 1512, 1514, and 1516 connected to the power interconnect 1552. Accordingly, the power interconnects 1510, 1512, 1514, and 1516 supply power to the power rails 1503, 1505, 1507, and 1509.

Figure 15B:
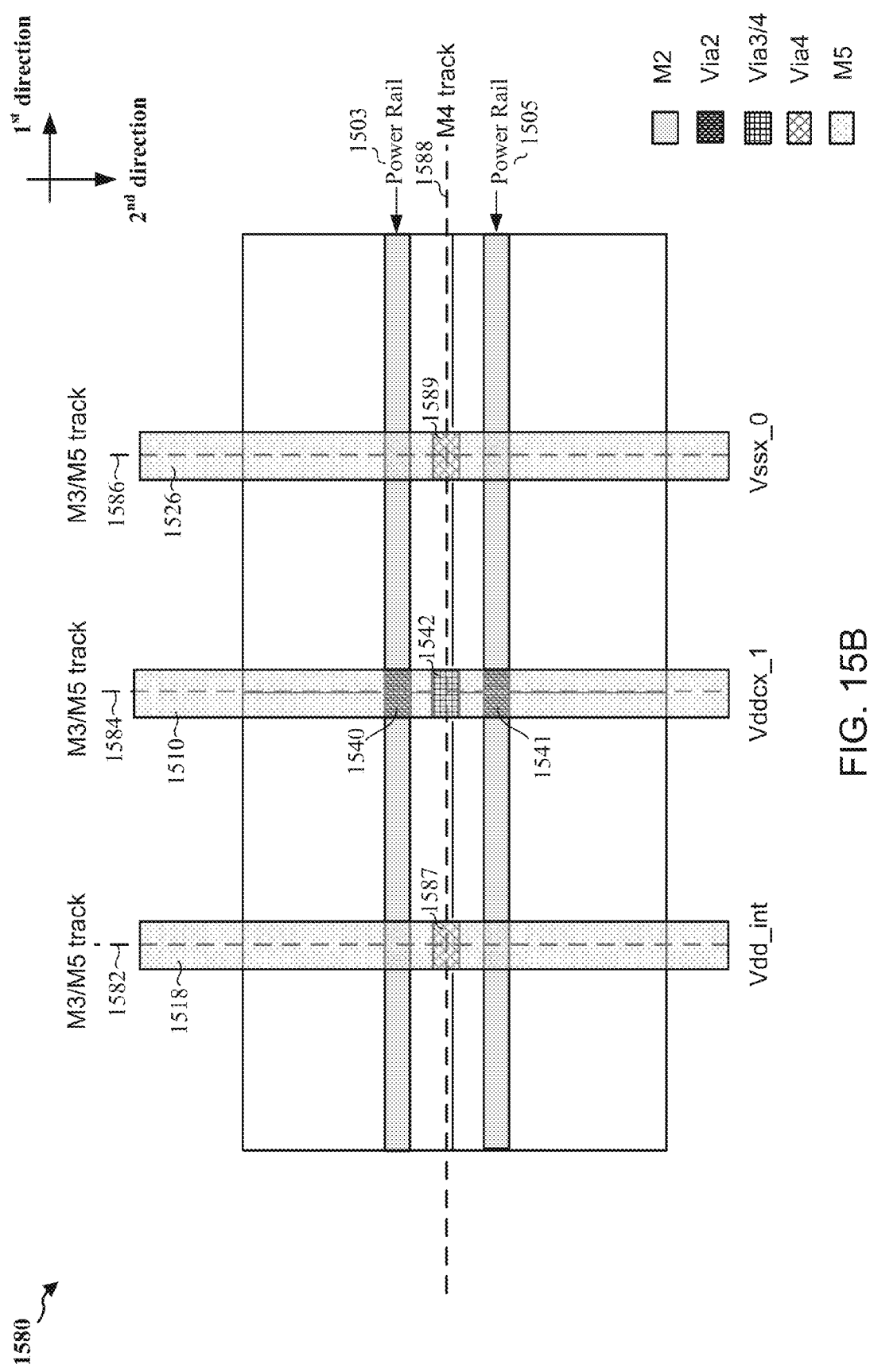
FIG. 15B is a diagram illustrating strap and via alignment in accordance with various aspects of the disclosure.

FIG. 15B is a diagram 1580 illustrating strap and via alignment in accordance with various aspects of the disclosure. Diagram 1580 shows an enlarged view of power interconnects 1518, 1510, 1526, vias 1540, 1541, 1542, and power rails 1503, 1505 described supra with respect to FIG. 15A. As shown in FIG. 15B, power interconnects 1518, 1510, and 1526 may be configured along the tracks defined for the M3 and M5 layers in the second direction. For example, the power interconnects 1518, 1510, and 1526 may be configured along respective M3/M5 tracks 1582, 1584, and 1586. As shown in FIG. 15B, the power interconnects 1518 and 1526 configured in the M5 layer may be coupled to the M3 layer through respective vias 1587 and 1589. The vias 1587, 1589 are configured on a track 1588 defined for the M4 layer along the first direction. As shown in FIG. 15B, the vias 1542 are configured along the M4 track 1588 and is aligned with vias 1587 and 1589.

Figure 15C:
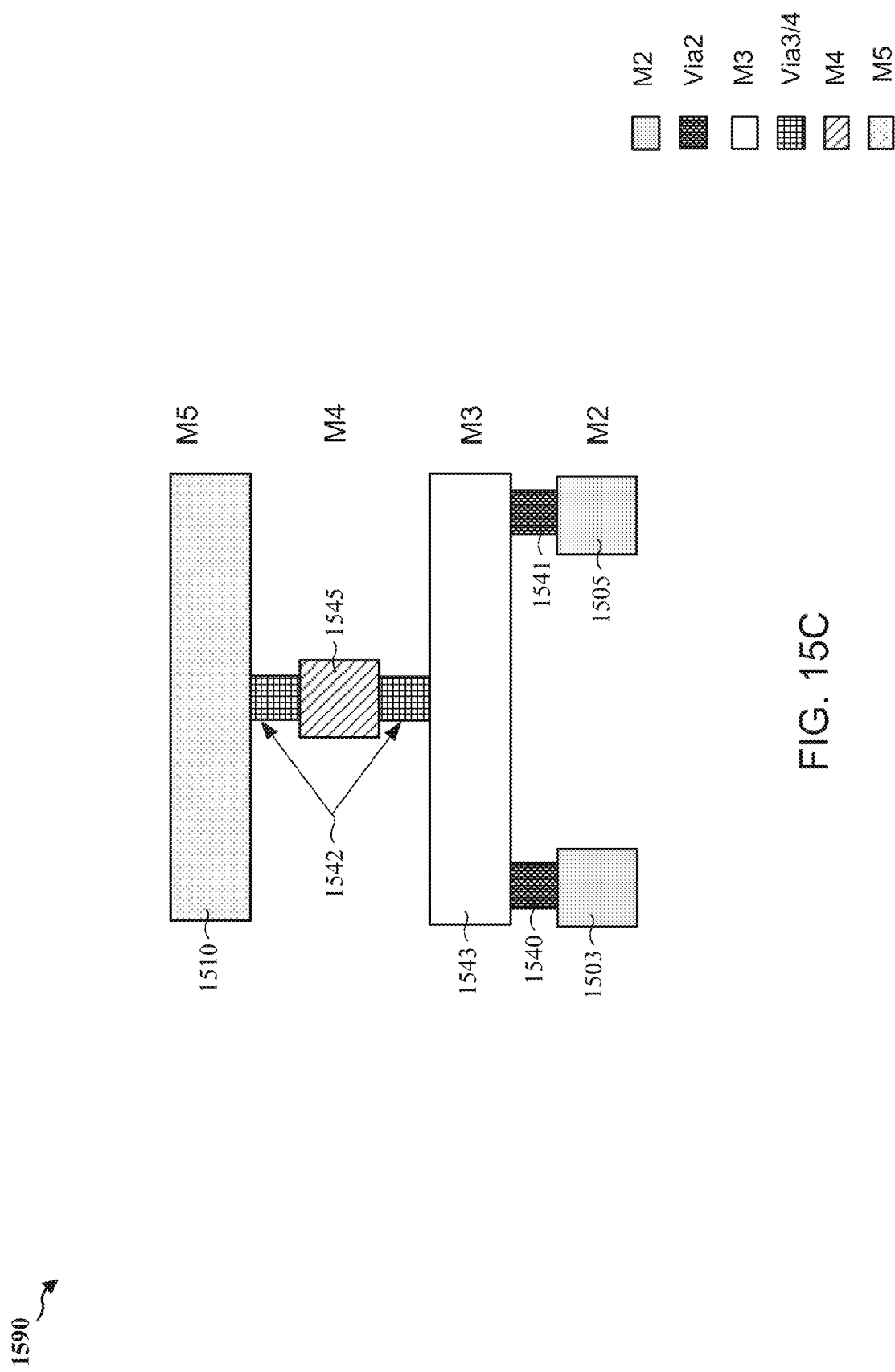
FIG. 15C is a diagram illustrating a cross-section view of an exemplary power strapping configuration in accordance with various aspects of the present disclosure.

FIG. 15C is a diagram 1590 illustrating a cross-section view along the M3/M5 track 1584 discussed supra with respect to FIG. 15B. As shown in FIG. 15C, power rails 1503, 1505 are connected to an interconnect 1543 in the M3 layer through respective vias 1540, 1541. The interconnect 1543 in the M3 layer is connected to the power interconnect 1510 in the M5 layer through the M4 layer 1545 using vias 1542.

Figure 16A:
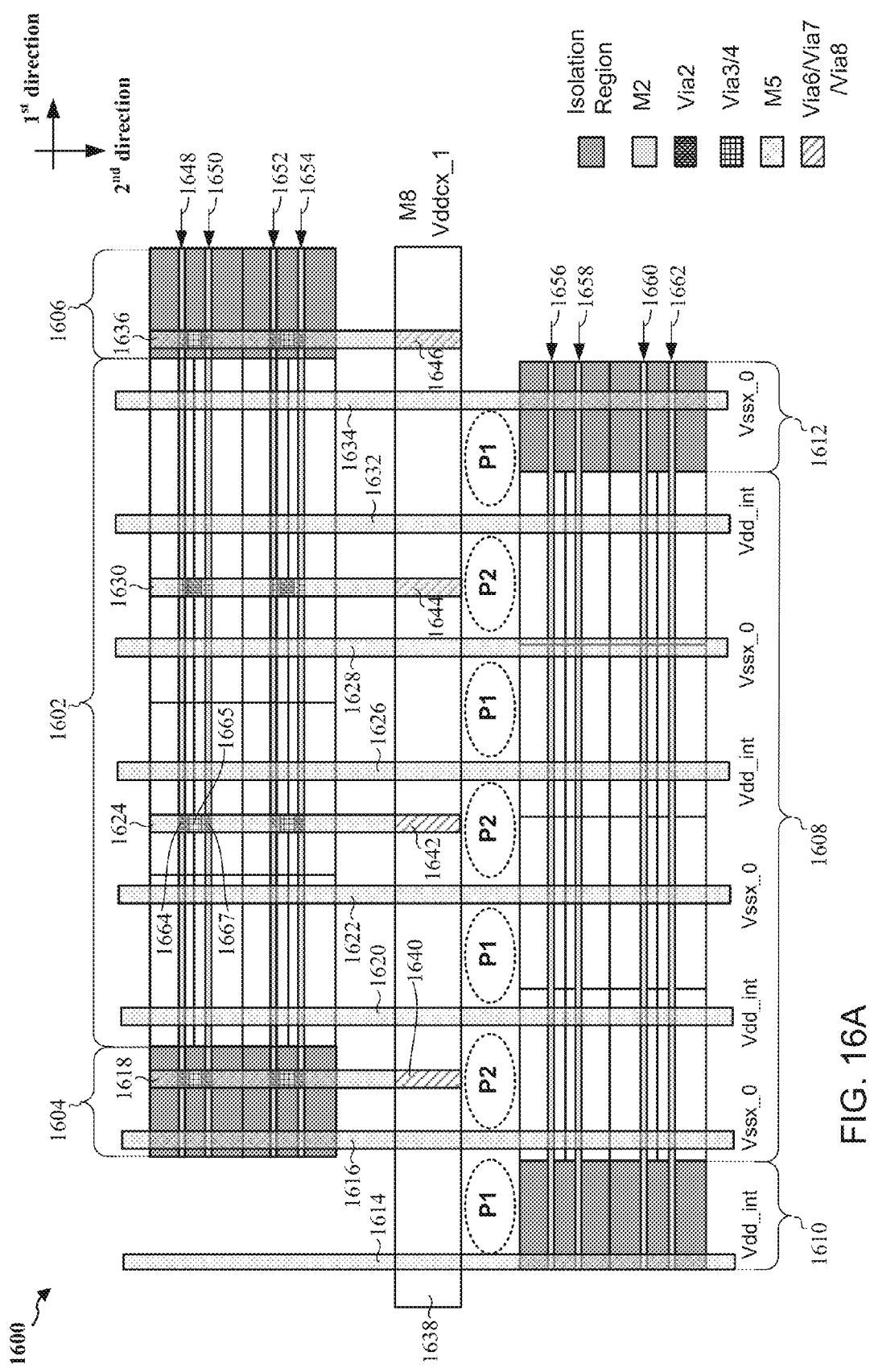
FIG. 16A is a diagram illustrating a top view of an exemplary power strapping configuration in a MOS device in accordance with various aspects of the present disclosure.

FIG. 16A is a diagram illustrating a top view of an exemplary power strapping configuration in a MOS device 1600 in accordance with various aspects of the present disclosure. FIG. 16A includes a first set of buffer cells 1602 and a second set of buffer cells 1608. In an aspect, the first set of buffer cells 1602 includes at least a portion of a first n-well (not shown in FIG. 16A). As shown in FIG. 16A, a first isolation region 1604 is included at one end of the first set of buffer cells 1602 and a second isolation region 1606 is included at the other end of the first set of buffer cells 1602 to prevent shorting of the first n-well to other nearby n-wells. In an aspect, the second set of buffer cells 1608 includes at least a portion of a second n-well (not shown in FIG. 16A). As shown in FIG. 16A, a third isolation region 1610 is included at one end of the second set of buffer cells 1608 and a fourth isolation region 1612 is included at the other end of the second set of buffer cells 1608 to prevent shorting of the second n-well to other nearby n-wells. FIG. 16A further includes M5 layer power interconnects 1614, 1620, 1626, and 1632, M5 layer power interconnects 1616, 1622, 1628, and 1634, and M5 layer power interconnects 1618, 1624, 1630, and 1636 extending in the second direction. As shown in FIG. 16A, the first set of buffer cells 1602 includes power rails 1648, 1650, 1652, and 1654 extending in the first direction, and the second set of buffer cells 1608 includes power rails 1656, 1658, 1660, and 1662 extending in the first direction.

In FIG. 16A, each of the power interconnects 1618, 1624, 1630, and 1636 in the M5 layer are connected to the power rails 1648, 1650, 1652, and 1654 in the M2 layer. For example, power interconnect 1624 is connected to the power rail 1648 through vias 1664 and 1665, where via 1664 connects the M2 layer to the M3 layer and where vias 1665 connect the M3 layer to the M5 layer through the M4 layer. In such example, power interconnect 1624 is connected to the power rail 1650 through vias 1665 and 1667, where via 1667 connects the M2 layer to the M3 layer and where vias 1665 connect the M3 layer to the M5 layer through the M4 layer. As shown in FIG. 16A, power interconnect 1624 is connected to power rails 1652 and 1654 using vias similar to vias 1664, 1665, and 1667.

As shown in FIG. 16A, each of the power interconnects 1618, 1624, 1630, and 1636 in the M5 layer are further connected to the interconnect 1638 configured in the M8 layer through respective vias 1640, 1642, 1644, and 1646. For example, the power interconnect 1624 is connected to the power interconnect 1638 through vias 1642, where vias 1642 connect the M5 layer to the M8 layer through the M6 and M7 layers. It should be noted that the power interconnects 1614, 1616, 1620, 1622, 1626, 1628, 1632, and 1634 are not connected to the power rails 1648, 1650, 1652, and 1654.

As shown in FIG. 16A, the power interconnects 1614, 1620, 1626, and 1632 are coupled to a first voltage source (e.g., Vdd_int), and power interconnects 1616, 1622, 1628, and 1634 are coupled to ground (e.g., Vssx_0). As further shown in FIG. 16A, the power interconnect 1638 is coupled to a second voltage source (e.g., Vddcx_1) and, therefore, the power interconnect 1638 provides the second voltage source (e.g., Vddcx_1) to each of the power interconnects 1618, 1624, 1630, and 1636 connected to the power interconnect 1638. Accordingly, the power interconnects 1618, 1624, 1630, and 1636 supply power to the power rails 1648, 1650, 1652, and 1654. As described infra with respect to FIGS. 16B and 16C, power interconnects configured to supply power to the power rails 1656, 1658, 1660, and 1662 may be formed over the second set of buffer cells 1608 extending through the regions identified as "P1" or extending through the regions identified as "P2".

Figure 16B:
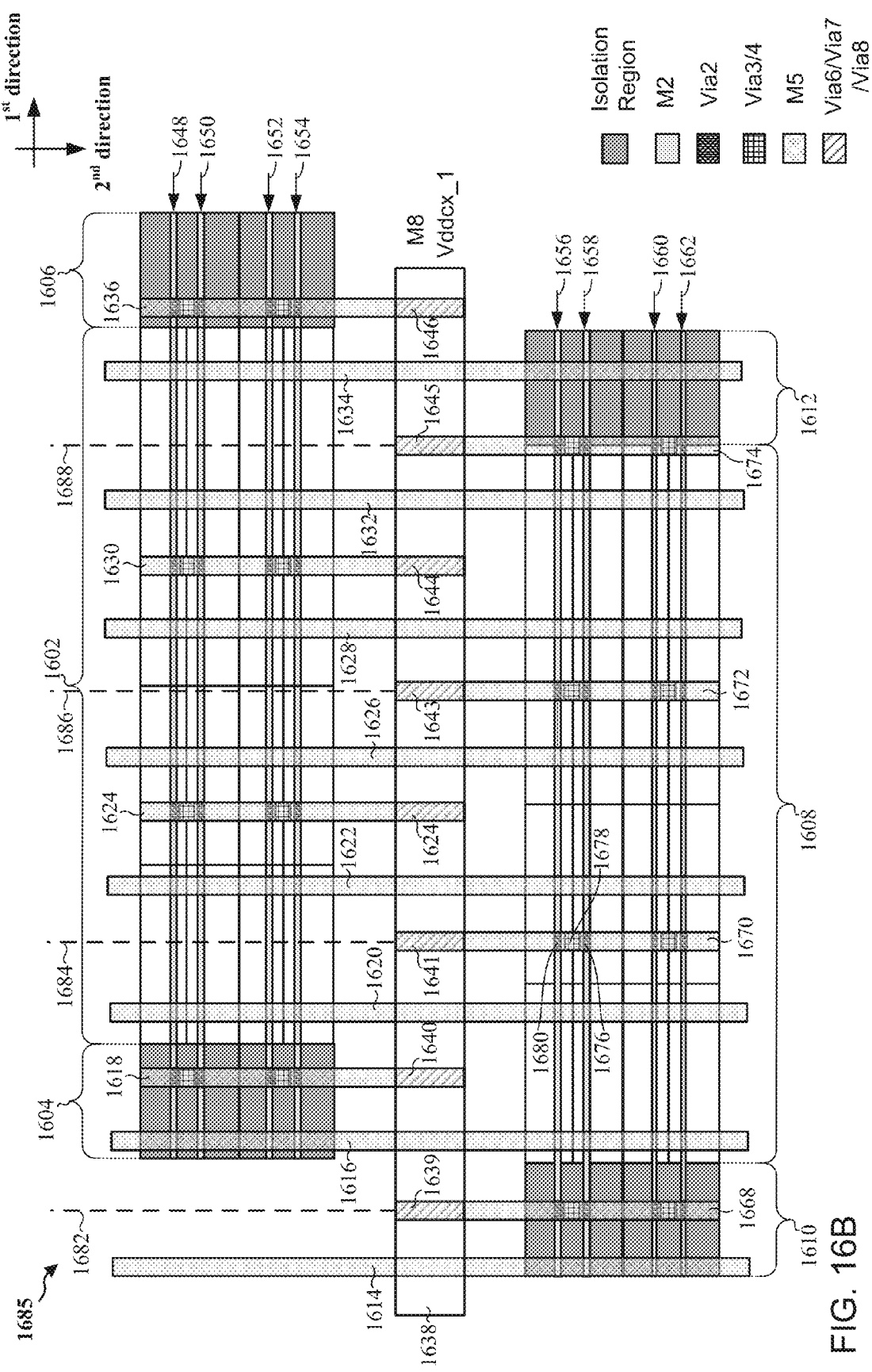
FIG. 16B is a diagram illustrating a top view of an exemplary power strapping configuration in accordance with various aspects of the present disclosure.

FIG. 16B is a diagram 1685 illustrating a top view of an exemplary power strapping configuration in accordance with various aspects of the present disclosure. FIG. 16B shows power M5 layer interconnects 1668, 1670, 1672, and 1674 extending in the second direction through the regions identified as "P1" in FIG. 16A. In FIG. 16B, each of the power interconnects 1668, 1670, 1672, and 1674 configured in the M5 layer are connected to the power rails 1656, 1658, 1660, and 1662 configured in the M2 layer. For example, power interconnect 1670 is connected to the power rail 1656 through vias 1680 and 1678, where via 1680 connects the M2 layer to the M3 layer and where vias 1678 connect the M3 layer to the M5 layer through the M4 layer. In such example, power interconnect 1670 is connected to the power rail 1658 through vias 1676 and 1678, where via 1676 connects the M2 layer to the M3 layer and where vias 1678 connect the M3 layer to the M5 layer through the M4 layer. As shown in FIG. 16B, power interconnect 1670 is connected to power rails 1660 and 1662 using vias similar to vias 1676, 1678, and 1680. As shown in FIG. 16B, each of the power interconnects 1668, 1670, 1672, and 1674 in the M5 layer are further connected to the interconnect 1638 configured in the M8 layer through respective vias 1639, 1641, 1643, and 1645. For example, the power interconnect 1670 is connected to the power interconnect 1638 through vias 1641, where vias 1641 connect the M5 layer to the M8 layer through the M6 and M7 layers. The power interconnects 1614, 1616, 1620, 1622, 1626, 1628, 1632, and 1634 are not connected to the power rails 1656, 1658, 1660, and 1662.

Figure 16C:
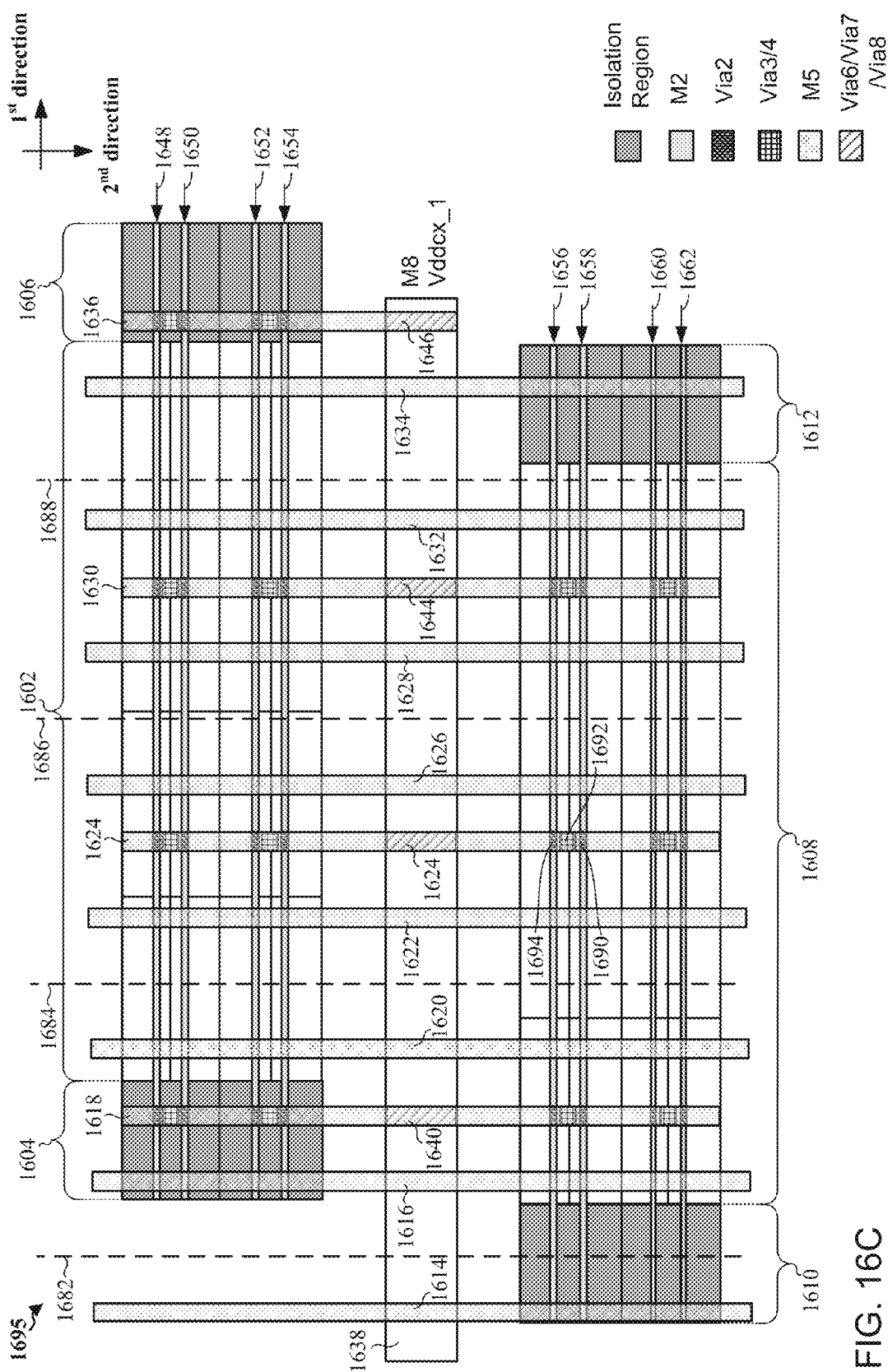
FIG. 16C is a diagram illustrating a top view of an exemplary power strapping configuration in accordance with various aspects of the present disclosure.

FIG. 16C is a diagram 1695 illustrating a top view of an exemplary power strapping configuration in accordance with various aspects of the present disclosure. FIG. 16C shows power M5 layer interconnects 1618, 1624, 1630, and 1636 extending in the second direction through the regions identified as "P2" in FIG. 16A. Accordingly, the power interconnects 1618, 1624, 1630, and 1636 are shared by the first and second sets of buffer cells 1602, 1608. In FIG. 16C, each of the power interconnects 1618, 1624, 1630, and 1636 configured in the M5 layer are connected to the power rails 1648, 1650, 1652, and 1654 configured in the M2 layer and are also connected to the power rails 1656, 1658, 1660, and 1662 configured in the M2 layer. For example, power interconnect 1624 is connected to the power rail 1656 through vias 1692 and 1694, where via 1694 connects the M2 layer to the M3 layer and where vias 1692 connect the M3 layer to the M5 layer through the M4 layer. In such example, power interconnect 1624 is connected to the power rail 1658 through vias 1690 and 1692, where via 1690 connects the M2 layer to the M3 layer and where vias 1692 connect the M3 layer to the M5 layer through the M4 layer. As shown in FIG. 16C, power interconnect 1624 is connected to power rails 1660 and 1662 using vias similar to vias 1690, 1692, and 1694.

Therefore, by configuring the power interconnects 1618, 1624, 1630, and 1636 to be shared by the first and second sets of buffers 1602, 1608, the tracks 1682, 1684, 1686, and 1688 (as indicated with dotted lines in FIG. 16C) in the M3 and M5 layer may remain available for routing. Therefore, the configuration of FIG. 16C may achieve power strapping for supplying power to the power rails in the first and second sets of buffer cells 1602, 1608 while reducing routing congestion as compared to the configuration of FIG. 16B where tracks 1682, 1684, 1686, and 1688 are blocked and remain unavailable for routing.

A MOS device (e.g., MOS device 600 in FIG. 6A or MOS device 1200 in FIG. 12) includes a set of standard cells extending in a first direction and including at least two standard cells, the set of standard cells including at least a portion of a first n-well coupled to a first voltage source. For example, with reference to FIGS. 6A and 6B, the set of standard cells may be the set of buffer cells 602 that includes buffer cells 604a, 604b, 604c, and 604d. As another example, with reference to FIG. 12, the set of standard cells may include the buffer cells 1202a, 1202b, 1202c, 1202d, 1202e, 1202f. The MOS device further includes a first isolation region adjacent a first side of the set of standard cells in the first direction, the first isolation region including a first n-well tap. For example, with reference to FIGS. 6A and 6B, the first isolation region may be the first isolation region 606 and the first n-well tap may be the tap 623. As another example, with reference to FIG. 12, the first isolation region may be the first isolation cell 1204 and the first n-well tap may be the tap 1218. The MOS device further includes a second isolation region adjacent a second side of the set of standard cells in the first direction, the second isolation region including a second n-well tap. For example, with reference to FIGS. 6A and 6B, the second isolation region may be the second isolation region 608 and the second n-well tap may be the tap 632. As another example, with reference to FIG. 12, the second isolation region may be the second isolation cell 1206 and the second n-well tap may be the tap 1220. The first n-well is isolated from a second n-well adjacent to the first n-well by at least one of the first and second isolation regions, the second n-well being coupled to a second voltage source. For example, with reference to FIGS. 6A and 6B, the first n-well may be the n-well 610 and the second n-well may be the n-well 616 or the n-well 618. As another example, with reference to FIG. 12, the first n-well may be the n-well 1208 and the second n-well may be the n-well 1214 or the n-well 1216.

In an aspect, the set of standard cells includes a number of standard cells adjacent to each other in the first direction, where the number of standard cells, the first isolation region, and the second isolation region all have a same height. For example, with reference with FIGS. 6A and 6B, buffer cells 604a, 604b, 604c, and 604d, the first isolation region 606, and the second isolation region 608 may all have the same height (e.g., a double height configuration as described with respect to FIG. 5).

In an aspect, the set of standard cells includes a first subset of standard cells (e.g., standard cells 1102a and 1102b in FIG. 11 or standard cells 1202a, 1202b, 1202c in FIG. 12) and a second subset of standard cells (e.g., standard cells 1102c and 1102d in FIG. 11 or standard cells 1202d, 1202e, and 1202f in FIG. 12) adjacent the first subset of standard cells in a second direction orthogonal to the first direction. In such aspect, each standard cell in the set of standard cells includes an M2 layer interconnect (e.g., power pins 1104a, 1104b, 1104c, and 1104d in FIG. 11 or power pins 1209, 1211 in FIG. 12) extending across the standard cell in the first direction, M2 layer interconnects of the standard cells in the first subset of standard cells forming a first M2 layer interconnect (e.g., power rail 1106a in FIG. 11 or power rail 1226 in FIG. 12) that extends across the first subset of standard cells in the first direction, M2 layer interconnects of the standard cells in the second subset of standard cells forming a second M2 layer interconnect (e.g., power rail 1106b in FIG. 11 or power rail 1228 in FIG. 12) that extends across the second subset of standard cells in the first direction.

In an aspect, the set of standard cells includes a first subset of standard cells (e.g., standard cells 1202a, 1202b, 1202c in FIG. 12) and a second subset of standard cells (e.g., standard cells 1202d, 1202e, 1202f in FIG. 12) adjacent the first subset of standard cells in a second direction orthogonal to the first direction, the first subset of standard cells including one or more standard cells adjacent to each other in the first direction, the second subset of standard cells including one or more standard cells adjacent to each other in the first direction, where the first isolation region 1204 and the second isolation 1206 each have a same height 1236, and standard cells in the first and second subsets of standard cells each have a height 1234 that is approximately half the height 1236 of the first and second isolation regions. In such aspect, each of the standard cells in the set of standard cells has an output (e.g., buffer output pin 1002b), each output being at a metal layer lower than the M3 layer. The output (e.g., buffer output pin 1002b) of each of the standard cells in the set of standard cells is at the M1 layer.

In an aspect, with reference to FIG. 15A, the MOS device (e.g., MOS device 1500) includes a first set of power interconnects 1518, 1520, 1522, 1524 extending across the device in the second direction, the first set of power interconnects being unconnected to the set of standard cells (e.g., the standard cells in rows 1502, 1504, 1506, 1508). The MOS device further includes a second set of power interconnects 1510, 1512, 1514, and 1516 extending across the device in the second direction, the second set of power interconnects being connected to the set of standard cells. The first set of power interconnects 1518, 1520, 1522, 1524 may have a first pitch 1532 and the second set of power interconnects 1502, 1504, 1506, 1508 has a second pitch 1536, the first pitch being approximately equal to the second pitch. In an aspect, the MOS device further includes a third set of power interconnects 1526, 1528, 1530 extending across the device in the second direction, the third set of power interconnects 1526, 1528, 1530 being unconnected to the set of standard cells (e.g., the standard cells in rows 1502, 1504, 1506, 1508), the third set of power interconnects 1526, 1528, 1530 having a third pitch 1538 that is approximately equal to the first pitch and the second pitch. In an aspect, each power interconnect in the second set of power interconnects 1502, 1504, 1506, 1508 extends in the second direction approximately midway between a power interconnect of the first set of power interconnects and a power interconnect of the third set of power interconnects. In an aspect, each power interconnect in the first set of power interconnects (e.g., first set of power interconnects 1518, 1520, 1522, 1524 in FIG. 15A or first set of power interconnects 1616, 1622, 1628, 1634 in FIG. 16C) extends adjacent to a power interconnect in the third set of power interconnects (e.g., third set of power interconnects 1526, 1528, 1530 in FIG. 15A or third set of power interconnects 1614, 1620, 1626, 1632 in FIG. 16C) without a power interconnect of the second set of power interconnects (e.g., second set of power interconnects 1510, 1512, 1514, 1516 in FIG. 15A or second set of power interconnects 1618, 1624, 1630, 1636 in FIG. 16C) therebetween.

In an aspect, with reference to FIG. 16C, the MOS device includes a second set of standard cells 1608 extending in the first direction, the second set of standard cells 1608 including at least two standard cells. The MOS device further includes a third isolation region 1610 adjacent a first side of the second set of standard cells 1608 in the first direction, the third isolation region 1610 including a third n-well tap (not shown). The MOS device further includes a fourth isolation region 1612 adjacent a second side of the second set of standard cells 1608 in the first direction, the fourth isolation region 1612 including a fourth n-well tap (not shown). The second set of standard cells 1608, the third isolation region 1610, and the fourth isolation region 1612 are dislocated from the set of standard cells 1602, the first isolation region

1604, and the second isolation region 1606. The MOS device further includes a fourth set of power interconnects (e.g., joined with power interconnects 1618, 1624, 1630, 1636 in FIG. 16C) extending across the MOS device in the second direction, the fourth set of power interconnects being connected to the second set of standard cells 1608. The power interconnects in the second set of power interconnects (e.g., second set of power interconnects 1618, 1624, 1630, 1636 in FIG. 16B) and the fourth set of power interconnects (e.g., fourth set of power interconnects 1668, 1670, 1672, 1674 in FIG. 16B) extend in the second direction on different tracks. For example, the fourth set of power interconnects 1668, 1670, 1672, 1674 extend on respective tracks 1682, 1684, 1686, and 1688, where the second set of power interconnects 1618, 1624, 1630, 1636 extend on tracks different than tracks 1682, 1684, 1686, and 1688.

In an aspect, with reference to FIG. 16C, a subset of power interconnects in the second set of power interconnects and the fourth set of power interconnects extend in the second direction on a same set of tracks. For example, with reference to FIG. 16C, power interconnects 1618, 1624, and 1630 extend in the second direction on a same set of tracks. In an aspect, the set of standard cells comprises at least one buffer cell (e.g., buffer cell 300).

Figure 17:
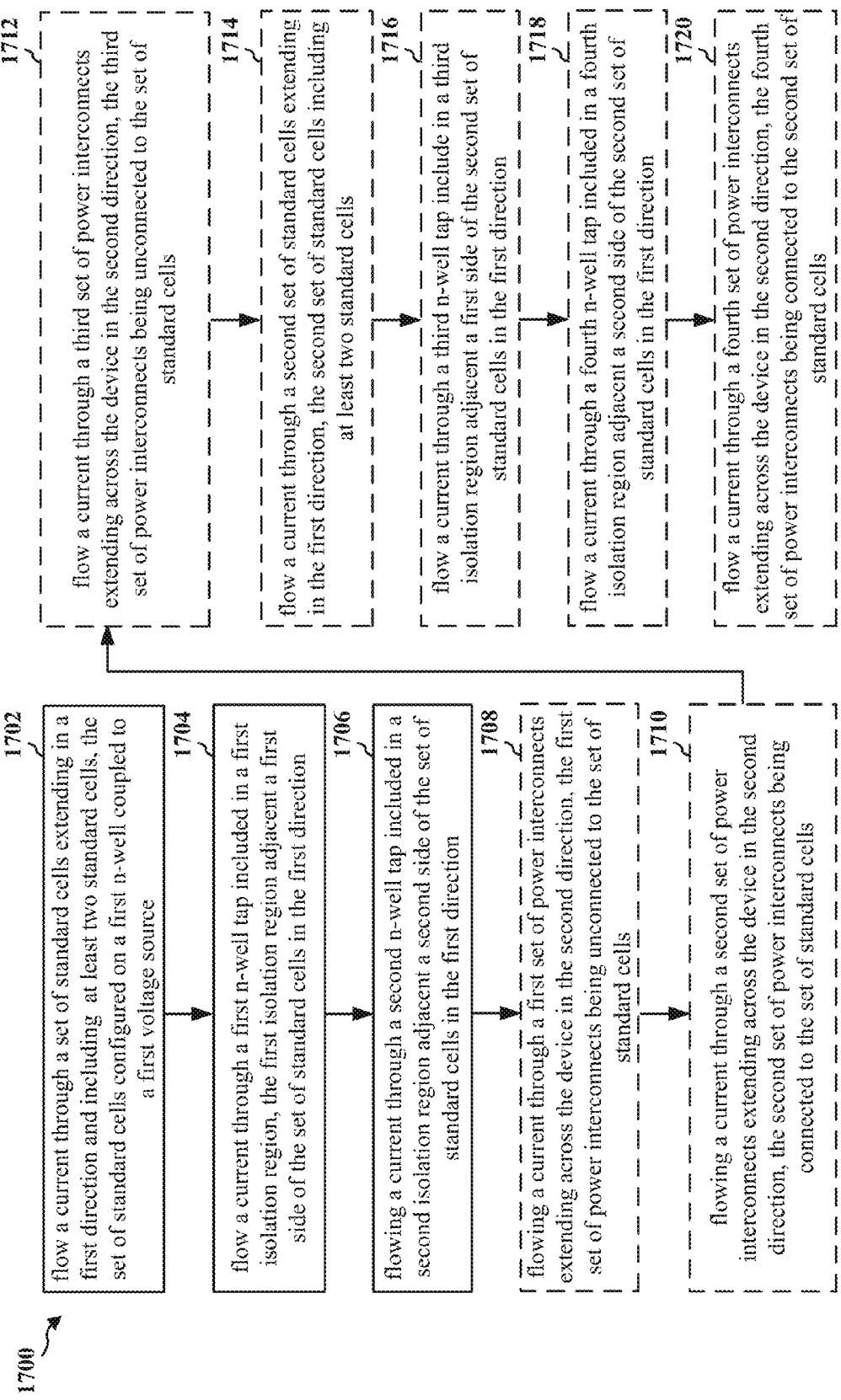
FIG. 17 is a flow chart of an exemplary method.

FIG. 17 is a flow chart 1700 of an exemplary method. The exemplary method is a method of operation of a MOS device. It should be understood that the operations indicated with dotted lines in FIG. 17 represent optional operations. At 1702, a current is flowed through a set of standard cells extending in a first direction and including at least two standard cells, the set of standard cells configured on a first n-well coupled to a first voltage source (e.g., Vddcx_1).

At 1704, a current is flowed through a first n-well tap included in a first isolation region, the first isolation region adjacent a first side of the set of standard cells in the first direction.

At 1706, a current is flowed through a second n-well tap included in a second isolation region adjacent a second side of the set of standard cells in the first direction. In an aspect, the first n-well is isolated from the second n-well adjacent to the first n-well by at least one of the first and second isolation regions, the second n-well being coupled to a second voltage source (e.g., Vdd_int). In an aspect, the set of standard cells includes a first subset of standard cells and a second subset of standard cells adjacent the first subset of standard cells in a second direction orthogonal to the first direction, and each standard cell in the set of standard cells includes an M2 layer interconnect extending across the standard cell in the first direction. In such aspect, M2 layer interconnects of the standard cells in the first subset of standard cells form a first M2 layer interconnect that extends across the first subset of standard cells in the first direction, and M2 layer interconnects of the standard cells in the second subset of standard cells form a second M2 layer interconnect that extends across the second subset of standard cells in the first direction. In an aspect, the set of standard cells includes a first subset of standard cells and a second subset of standard cells adjacent the first subset of standard cells in a second direction orthogonal to the first direction, where the first subset of standard cells include one or more standard cells adjacent to each other in the first direction, and where the second subset of standard cells includes one or more standard cells adjacent to each other in the first direction. In such aspect, the first isolation region and the second isolation each have a same height, and standard cells in the first and second subsets of standard cells each have a height approximately half the height of the first and second isolation regions.

At 1708, a current is flowed through a first set of power interconnects extending across the device in the second direction, the first set of power interconnects being unconnected to the set of standard cells.

At 1710, a current is flowed through a second set of power interconnects extending across the device in the second direction, the second set of power interconnects being connected to the set of standard cells. In an aspect, the first set of power interconnects has a first pitch and the second set of power interconnects has a second pitch, the first pitch being approximately equal to the second pitch.

At 1712, a current is flowed through a third set of power interconnects extending across the device in the second direction, the third set of power interconnects being unconnected to the set of standard cells. In an aspect, the third set of power interconnects have a third pitch that is approximately equal to the first pitch and the second pitch.

At 1714, a current is flowed through a second set of standard cells extending in the first direction, the second set of standard cells including at least two standard cells.

At 1716, a current is flowed through a third n-well tap include in a third isolation region adjacent a first side of the second set of standard cells in the first direction.

At 1718, a current is flowed through a fourth n-well tap included in a fourth isolation region adjacent a second side of the second set of standard cells in the first direction. In an aspect, the second set of standard cells, the third isolation region, and the fourth isolation region are dislocated from the set of standard cells, the first isolation region, and the second isolation region.

At 1720, a current is flowed through a fourth set of power interconnects extending across the device in the second direction, the fourth set of power interconnects being connected to the second set of standard cells.

In an aspect, a MOS device includes means for flowing a current through a set of standard cells extending in a first direction and including at least two standard cells, the set of standard cells including at least a portion of a first n-well coupled to a first voltage source. For example, the means for flowing a current through a set of standard cells extending in a first direction may be the set of standard cells extending in a first direction. The MOS device further includes means for flowing a current through a first n-well tap included in a first isolation region, the first isolation region adjacent a first side of the set of standard cells in the first direction. For example, the means for flowing a current through a first n-well tap may be the first n-well tap. The MOS device further includes means for flowing a current through a second n-well tap included in a second isolation region adjacent a second side of the set of standard cells in the first direction. For example, the means for flowing a current through the second n-well tap may be the second n-well tap. In an aspect, the first n-well is isolated from the second n-well adjacent to the first n-well by at least one of the first and second isolation regions, the second n-well being coupled to a second voltage source.

In an aspect, the set of standard cells includes a first subset of standard cells and a second subset of standard cells adjacent the first subset of standard cells in a second direction orthogonal to the first direction, and where each standard cell in the set of standard cells includes an M2 layer interconnect extending across the standard cell in the first direction. The M2 layer interconnects of the standard cells in the first subset of standard cells form a first M2 layer interconnect that extends across the first subset of standard cells in the first direction. The M2 layer interconnects of the standard cells in the second subset of standard cells form a second M2 layer interconnect that extends across the second subset of standard cells in the first direction.

In an aspect, the set of standard cells includes a first subset of standard cells and a second subset of standard cells adjacent the first subset of standard cells in a second direction orthogonal to the first direction, the first subset of standard cells including one or more standard cells adjacent to each other in the first direction. The second subset of standard cells includes one or more standard cells adjacent to each other in the first direction, where the first isolation region and the second isolation each have a same height, and standard cells in the first and second subsets of standard cells each have a height approximately half the height of the first and second isolation regions.

The MOS device further includes means for flowing a current through a first set of power interconnects extending across the device in the second direction, the first set of power interconnects being unconnected to the set of standard cells. For example, the means for flowing a current through a first set of power interconnects extending across the device in the second direction may be the first set of power interconnects. The MOS device further includes means for flowing a current through a second set of power interconnects extending across the device in the second direction, the second set of power interconnects being connected to the set of standard cells. For example, the means for flowing a current through a second set of power interconnects may be the second set of power interconnects. In an aspect, the first set of power interconnects has a first pitch and the second set of power interconnects has a second pitch, the first pitch being approximately equal to the second pitch.

The MOS device further includes means for flowing a current through a third set of power interconnects extending across the device in the second direction, where the third set of power interconnects is unconnected to the set of standard cells. For example, the means for flowing a current through a third set of power interconnects extending across the device in the second direction may be the third set of power interconnects. The third set of power interconnects have a third pitch that is approximately equal to the first pitch and the second pitch.

As described supra, the aspects of the disclosure may reduce routing congestion in the MOS device. For example, the standard cells in the set may be single height standard cells. The input and output signal pins of the single height standard cells may be configured in a lowest possible metal layer, such as the metal 1 (M1) layer, and the secondary power pins of the single height standard cells may be configured in the metal 2 (M2) layer. Interconnects supplying power to these secondary power pins in the M2 layer may be configured along vertical tracks and shared among different sets of standard cells. Such a configuration may reduce the number of vertical tracks used in the MOS device, thereby reducing routing congestion in the MOS device. Moreover, since horizontal tracks used for the primary power/ground mesh in the MOS device are also used for a power connection, the configurations of the disclosure may not reduce the number of horizontal tracks available for routing in the MOS device.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A metal oxide semiconductor (MOS) device, comprising:
   a set of standard cells extending in a first direction and including at least two standard cells, the set of standard cells comprising at least a portion of a first n-type well (n-well) coupled to a first voltage source;
   a first isolation region adjacent a first side of the set of standard cells in the first direction, the first isolation region including a first n-well tap; and
   a second isolation region adjacent a second side of the set of standard cells in the first direction, the second isolation region including a second n-well tap,
   wherein the first n-well is isolated from a second n-well adjacent to the first n-well by at least one of the first and second isolation regions, the second n-well being coupled to a second voltage source, and
   wherein the set of standard cells further comprising a first subset of standard cells and a second subset of standard cells adjacent the first subset of standard cells in a second direction orthogonal to the first direction, and wherein each standard cell in the set of standard cells comprises a metal 2 (M2) layer interconnect extending across the standard cell in the first direction, M2 layer interconnects of the standard cells in the first subset of standard cells forming a first M2 layer interconnect that extends across the first subset of standard cells in the first direction, M2 layer interconnects of the standard cells in the second subset of standard cells forming a second M2 layer interconnect that extends across the second subset of standard cells in the first direction.

2. The device of claim 1, wherein the set of standard cells comprises a plurality of standard cells adjacent to each other in the first direction, wherein the plurality of standard cells, the first isolation region, and the second isolation region all have a same height.

3. The device of claim 1, wherein the first subset of standard cells includes one or more standard cells adjacent to each other in the first direction, the second subset of standard cells includes one or more standard cells adjacent to each other in the first direction, the first isolation region and the second isolation region each have a same height, and standard cells in the first and second subsets of standard cells each have a height approximately half the height of the first and second isolation regions.

4. The device of claim 3, wherein each of the standard cells in the set of standard cells has an output, each output being at a metal layer lower than a metal 3 (M3) layer.

5. The device of claim 4, wherein the output of each of the standard cells in the set of standard cells is at a metal 1 (M1) layer.

6. The device of claim 3, further comprising:
a first set of power interconnects extending across the device in the second direction, the first set of power interconnects being unconnected to the set of standard cells; and
a second set of power interconnects extending across the device in the second direction, the second set of power interconnects being connected to the set of standard cells.

7. The device of claim 6, wherein the first set of power interconnects has a first pitch and the second set of power interconnects has a second pitch, the first pitch being approximately equal to the second pitch.

8. The device of claim 7, further comprising a third set of power interconnects extending across the device in the second direction, the third set of power interconnects being unconnected to the set of standard cells, the third set of power interconnects having a third pitch that is approximately equal to the first pitch and the second pitch.

9. The device of claim 8, wherein each power interconnect in the second set of power interconnects extends in the second direction approximately midway between a power interconnect of the first set of power interconnects and a power interconnect of the third set of power interconnects, wherein a first set of vias respectively coupled to each power interconnect in the first set of power interconnects is aligned in the first direction with a second set of vias respectively coupled to each power interconnect in the second set of power interconnects, and wherein the second set of vias are not configured in one or more unused tracks in a metal 4 (M4) layer.

10. The device of claim 8, wherein each power interconnect in the first set of power interconnects extends adjacent to a power interconnect in the third set of power interconnects without a power interconnect of the second set of power interconnects therebetween.

11. The device of claim 6, further comprising:
a second set of standard cells extending in the first direction, the second set of standard cells including at least two standard cells;
a third isolation region adjacent a first side of the second set of standard cells in the first direction, the third isolation region including a third n-well tap; and
a fourth isolation region adjacent a second side of the second set of standard cells in the first direction, the fourth isolation region including a fourth n-well tap,
wherein the second set of standard cells, the third isolation region, and the fourth isolation region are dislocated from the set of standard cells, the first isolation region, the second isolation region.

12. The device of claim 11, further comprising a fourth set of power interconnects extending across the device in the second direction, the fourth set of power interconnects being connected to the second set of standard cells.

13. The device of claim 12, wherein power interconnects in the second set of power interconnects and the fourth set of power interconnects extend in the second direction on different tracks.

14. The device of claim 12, wherein a subset of power interconnects in the second set of power interconnects and the fourth set of power interconnects extend in the second direction on a same set of tracks.

15. The device of claim 1, wherein the set of standard cells comprises at least one buffer cell.

16. A method of operation of a metal oxide semiconductor (MOS) device, comprising:
flowing a current through a set of standard cells extending in a first direction and including at least two standard cells, the set of standard cells comprising at least a portion of a first n-type well (n-well) coupled to a first voltage source;
flowing a current through a first n-well tap included in a first isolation region, the first isolation region adjacent a first side of the set of standard cells in the first direction; and
flowing a current through a second n-well tap included in a second isolation region adjacent a second side of the set of standard cells in the first direction,
wherein the first n-well is isolated from the second n-well adjacent to the first n-well by at least one of the first and second isolation regions, the second n-well being coupled to a second voltage source, and
wherein the set of standard cells further comprising a first subset of standard cells and a second subset of standard cells adjacent the first subset of standard cells in a second direction orthogonal to the first direction, and wherein each standard cell in the set of standard cells comprises a metal 2 (M2) layer interconnect extending across the standard cell in the first direction, M2 layer interconnects of the standard cells in the first subset of standard cells forming a first M2 layer interconnect that extends across the first subset of standard cells in the first direction, M2 layer interconnects of the standard cells in the second subset of standard cells forming a second M2 layer interconnect that extends across the second subset of standard cells in the first direction.

17. The method of claim 16, wherein the first subset of standard cells includes one or more standard cells adjacent to each other in the first direction, the second subset of standard cells includes one or more standard cells adjacent to each other in the first direction, the first isolation region and the second isolation region each have a same height, and standard cells in the first and second subsets of standard cells each have a height approximately half the height of the first and second isolation regions.

18. The method of claim 17, further comprising:
flowing a current through a first set of power interconnects extending across the device in the second direction, the first set of power interconnects being unconnected to the set of standard cells; and flowing a current through a second set of power interconnects extending across the device in the second direction, the second set of power interconnects being connected to the set of standard cells.

19. The method of claim 18, wherein the first set of power interconnects has a first pitch and the second set of power interconnects has a second pitch, the first pitch being approximately equal to the second pitch.

20. The method of claim 19, further comprising flowing a current through a third set of power interconnects extending across the device in the second direction, the third set of power interconnects being unconnected to the set of standard cells, the third set of power interconnects having a third pitch that is approximately equal to the first pitch and the second pitch.

21. The method of claim 18, further comprising:
flowing a current through a second set of standard cells extending in the first direction, the second set of standard cells including at least two standard cells;
flowing a current through a third n-well tap included in a third isolation region adjacent a first side of the second set of standard cells in the first direction; and
flowing a current through a fourth n-well tap included in a fourth isolation region adjacent a second side of the second set of standard cells in the first direction,
wherein the second set of standard cells, the third isolation region, and the fourth isolation region are dislocated from the set of standard cells, the first isolation region, the second isolation region.

22. The method of claim 21, further comprising flowing a current through a fourth set of power interconnects extending across the device in the second direction, the fourth set of power interconnects being connected to the second set of standard cells.

23. A metal oxide semiconductor (MOS) device, comprising:
means for flowing a current through a set of standard cells extending in a first direction and including at least two standard cells, the set of standard cells comprising at least a portion of a first n-type well (n-well) coupled to a first voltage source;
means for flowing a current through a first n-well tap included in a first isolation region, the first isolation region adjacent a first side of the set of standard cells in the first direction; and
means for flowing a current through a second n-well tap included in a second isolation region adjacent a second side of the set of standard cells in the first direction,
wherein the first n-well is isolated from the second n-well adjacent to the first n-well by at least one of the first and second isolation regions, the second n-well being coupled to a second voltage source, and
wherein the set of standard cells comprises a first subset of standard cells and a second subset of standard cells adjacent the first subset of standard cells in a second direction orthogonal to the first direction, and wherein each standard cell in the set of standard cells comprises a metal 2 (M2) layer interconnect extending across the standard cell in the first direction, M2 layer interconnects of the standard cells in the first subset of standard cells forming a first M2 layer interconnect that extends across the first subset of standard cells in the first direction, M2 layer interconnects of the standard cells in the second subset of standard cells forming a second M2 layer interconnect that extends across the second subset of standard cells in the first direction.

24. The MOS device of claim 23, wherein the first subset of standard cells includes one or more standard cells adjacent to each other in the first direction, the second subset of standard cells includes one or more standard cells adjacent to each other in the first direction, the first isolation region and the second isolation region each have a same height, and standard cells in the first and second subsets of standard cells each have a height approximately half the height of the first and second isolation regions.

25. The MOS device of claim 24, further comprising:
means for flowing a current through a first set of power interconnects extending across the device in the second direction, the first set of power interconnects being unconnected to the set of standard cells; and
means for flowing a current through a second set of power interconnects extending across the device in the second direction, the second set of power interconnects being connected to the set of standard cells.

26. The MOS device of claim 25, wherein the first set of power interconnects has a first pitch and the second set of power interconnects has a second pitch, the first pitch being approximately equal to the second pitch.

27. The MOS device of claim 26, further comprising means for flowing a current through a third set of power interconnects extending across the device in the second direction, the third set of power interconnects being unconnected to the set of standard cells, the third set of power interconnects having a third pitch that is approximately equal to the first pitch and the second pitch.

* * * * *